United States Patent
Yeh

(10) Patent No.: US 8,392,691 B2
(45) Date of Patent: Mar. 5, 2013

(54) DATA MANAGEMENT METHOD, MEMORY CONTROLLER AND MEMORY STORAGE APPARATUS

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 252 days.

(21) Appl. No.: 13/030,147

(22) Filed: Feb. 18, 2011

(65) Prior Publication Data

US 2012/0110300 A1 May 3, 2012

(30) Foreign Application Priority Data

Nov. 1, 2010 (TW) ................................ 99137487 A

(51) Int. Cl.
*G06F 13/00* (2006.01)
*G06F 13/28* (2006.01)
*G06F 9/26* (2006.01)
*G06F 9/34* (2006.01)

(52) U.S. Cl. ................. 711/209; 711/103; 711/E12.078
(58) Field of Classification Search .......................... None
See application file for complete search history.

(56) References Cited

U.S. PATENT DOCUMENTS

2012/0159043 A1* 6/2012 Yeh ................................ 711/103

* cited by examiner

*Primary Examiner* — Kevin Verbrugge
*Assistant Examiner* — Eric S Cardwell
(74) *Attorney, Agent, or Firm* — Jianq Chyun IP Office

(57) ABSTRACT

A data management method, a memory controller and a memory storage apparatus are provided. The method includes grouping physical units of a rewritable non-volatile memory module into at least a data area and a free area. The method also includes configuring logical units for mapping to the physical units of the data area and writing update data belonging to the logical pages of the logical units orderly into the physical pages of physical units gotten from the free area. The method further includes configuring root units for the logical pages, configuring an entry chain for each of the root units and building entries on the entry chains for recording update information of the updated logical pages, wherein each of the logical pages corresponds to a root unit. Accordingly, the table size for storing the update information is effectively reduced and the time for searching valid data is effectively shortened.

18 Claims, 30 Drawing Sheets

DATA MANAGEMENT METHOD, MEMORY CONTROLLER AND MEMORY STORAGE APPARATUS

CROSS-REFERENCE TO RELATED APPLICATION

This application claims the priority benefit of Taiwan application serial no. 99137487, filed on Nov. 1, 2010. The entirety of the above-mentioned patent application is hereby incorporated by reference herein and made a part of this specification.

BACKGROUND

1. Technology Field

The invention relates to a data management method and particularly to a management method for data written in a physical block of a rewritable non-volatile memory module and a memory controller and a memory storage apparatus using the same.

2. Description of Related Art

Digital cameras, cells phones, and digital music players have undergone rapid growth in recent years. Thus, consumer demand for storage media has also rapidly increased. Rewritable non-volatile memory is one of the most adaptable memories for battery-powered portable products such as laptop computers due to its characteristics such as data non-volatility, low power consumption, small volume, non-mechanical structure, and high read and write speed. A solid-state drive (SSD) is a storage apparatus adopting flash memory as storage medium. Therefore, the flash memory industry has become a very important part of the electronic industry in recent years.

A memory sub-module of a flash memory module has a plurality of physical units. Each physical unit is formed from one or more physical blocks, and each physical block has a plurality of physical pages, wherein data must be written into a physical block according to the sequence of the physical pages in the physical block. Additionally, a physical page with data has to be erased before data is written in again. In particular, a smallest unit for erasing data is one physical block, and a smallest unit for programming (also referred to writing) data is one physical page. Therefore, in the management of the flash memory module, the physical units are grouped into a data area and a free area.

The physical units of the data area have used for storing data written by the host system. To be specific, a memory management circuit converts the logical access addresses accessed by the host system into corresponding logical pages of logical units, and maps the logical pages of the logical units to the physical pages of the physical units of the data area. Namely, in the management of the flash memory module, the physical units of the data area are used physical units (i.e. physical units storing data written by the host system). For example, the memory management circuit may use a logical unit-physical unit mapping table to record a mapping relationship between the logical units and the physical units of the data area, wherein the logical pages of the logical units are sequentially corresponding to the mapped physical pages of the physical units.

The physical units of the free area are used for substituting the physical units of the data area. Specifically, as described above, physical blocks written data must be erased before they are used for writing data again. Thus, the physical units of the free area are used to write update data to substitute the physical units that map the logical units. Hence, the physical units in the free area are either blank or available units (i.e., no data is recorded in these units or data recorded in these units is marked as useless data).

In other words, the physical pages of the physical units in the data area and the free area are alternatively used to map the logical pages of the logical units, to store data written by the host system. For example, the memory management circuit of a storage apparatus may get one or more physical units from the free area to be a global random unit, and when a logical access address that the host system is about to write update data into is corresponding to a logical page of a logical unit of the storage apparatus, the memory management circuit of the storage apparatus may write the update data in a physical page of the global random unit. In addition, the memory management circuit may record information indicating that the written physical page stores the update data of a logical page in a redundant bit area of the written physical pages or in an inverse mapping table, and the physical page originally mapped to the logical page will be marked as an invalid page. Accordingly, when update data of a logical page of a logical unit is stored in the global random unit, the memory management circuit must search for information from the entire inverse mapping table or the redundant bit area of the physical pages of the global random unit, and then read the valid data belonging to the logical unit. The search is very time-consuming, lowering the system effectiveness.

In particular, if the amount of available physical units in the free area is less than a predetermined threshold value, when writing commands, the memory management circuit must proceed with data merging, to avoid exhausting the physical units of the free area. Specifically, in the data merging process, the memory management circuit will get an empty physical unit from the free area, and copy valid data belonging to the same logical unit among the physical unit of the global random unit and the data area to the gotten physical block. From this, the physical units of the global random unit and the data area for storing invalid data can be erased and associated with the free area. Since the memory management circuit must perform the mentioned search during the data merging process to read all the valid data of the logical units, the data merging process performed by the memory management circuit will substantially extend the time for writing commands, even causing delay. Therefore, how to effectively manage the stored update data in the global random unit, and shorten the time required for accessing data, is one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention provides a data management method, a memory controller, and a memory storage apparatus, which can effectively search data stored in a global random unit, shorten the time required for a data merging process, and increase the speed for writing commands.

The exemplary embodiment of the invention provides a data management method for managing data written in a rewritable non-volatile memory module, wherein the rewritable non-volatile memory module includes a plurality of physical units, and each of the physical units includes a plurality of physical pages. The data management method includes grouping the physical units into at least a data area and a free area, wherein the physical units of the free area are used to substitute the physical units of the data area to write data. The data management method includes configuring a plurality of logical units for mapping the physical units of the data area, and building a logical unit-physical unit mapping table to record a mapping relationship between the logical units and the physical units of the data area, wherein each of the logical units includes a plurality of logical pages for mapping the physical pages of each of the physical units of the data area. The data management method further includes configuring a plurality of root units for the logical pages of the logical units, wherein each of the logical pages corresponds to one of the root units. The data management method further includes configuring an entry chain for each of the root units. The data management method further includes getting at least one physical unit from the free area to be at least one global random unit, writing a plurality of update data belonging to a plurality of updated logical pages among the logical pages into the physical pages of the global random unit, and maintaining the entry chains to record a plurality of update information corresponding to the updated logical pages, wherein the update information corresponding to the updated logical pages belonging to the same root unit is recorded on one of the entry chains.

The exemplary embodiment of the invention provides a memory controller, used to manage a rewritable non-volatile memory module, wherein the rewriteable non-volatile memory module includes a plurality of physical units. The memory controller includes a host interface, a memory interface, and a memory management circuit. The host interface is configured to couple to a host system, and the memory interface is configured to couple to the rewritable non-volatile memory module. The memory management circuit is coupled to the host interface and the memory interface, and configured to perform the mentioned data management method.

The exemplary embodiment of the invention provides a memory storage apparatus, including a connector, a rewritable non-volatile memory module, and a memory controller. The rewritable non-volatile memory module includes a plurality of physical units. The memory controller is coupled to the rewritable non-volatile memory module and the connector, and configured to perform the mentioned data management method.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 7I is a diagram illustrating an example of a global random unit search table according to FIG. 6I.

DESCRIPTION OF EMBODIMENTS

Figure 1A:
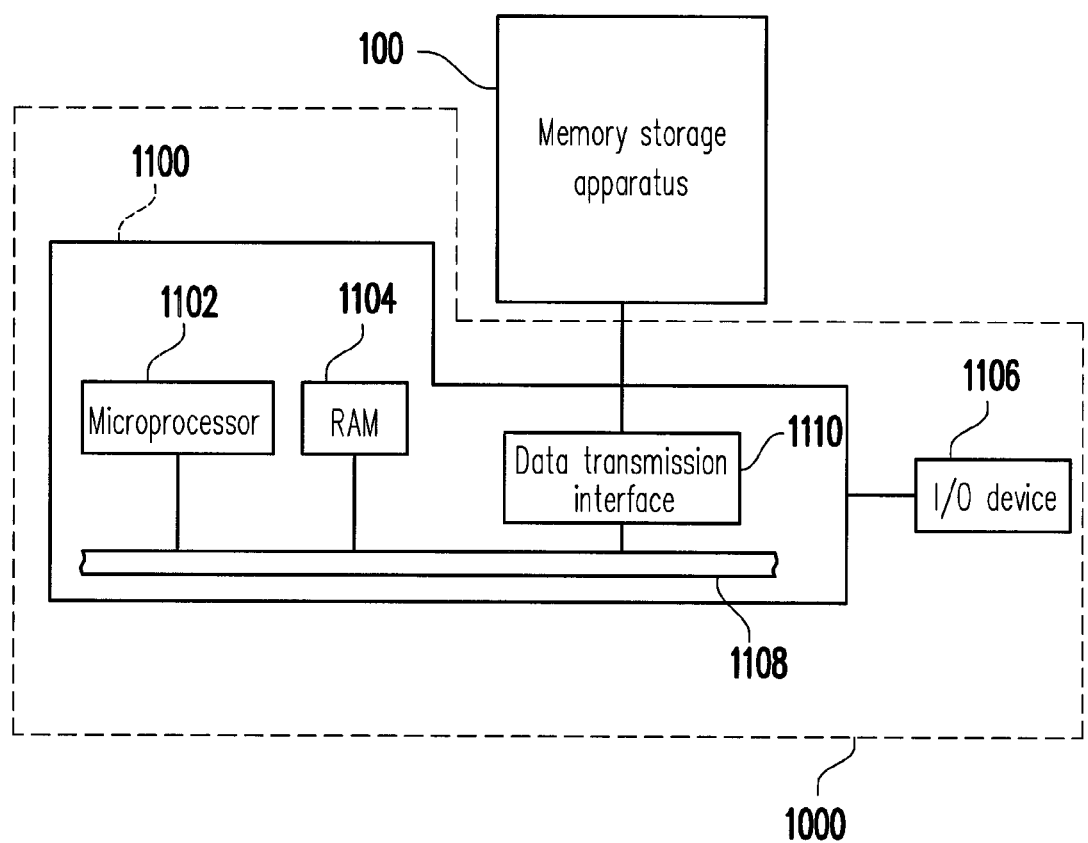
FIG. 1A is a schematic block diagram of a host system and a memory storage apparatus according to the first exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In order to search valid data corresponding to a logical unit among a global random unit quickly, the invention provides a data management method. In the method, all the logical pages of the logical units are sequentially grouped into a plurality of root units, an entry chain is configured on each root unit, and update information of the logical pages of the same root unit is recorded in the corresponding entry chain. Therefore, when needing to read all the valid data of a logical unit (for example, performing a data merging process), all the valid data belonging to the logical unit can be searched quickly according to the entry chain of the corresponding root unit. Several exemplary embodiments are described below to illustrate the invention in detail.

First Exemplary Embodiment

A memory storage apparatus (i.e., a memory storage system), typically includes a rewritable non-volatile memory module and a controller (i.e., a control circuit). The memory storage apparatus is usually used together with a host system so that the host system can write data into or read data from the memory storage apparatus.

FIG. 1A is a schematic block diagram of a host system and a memory storage apparatus according to the first exemplary embodiment of the invention.

Figure 1B:
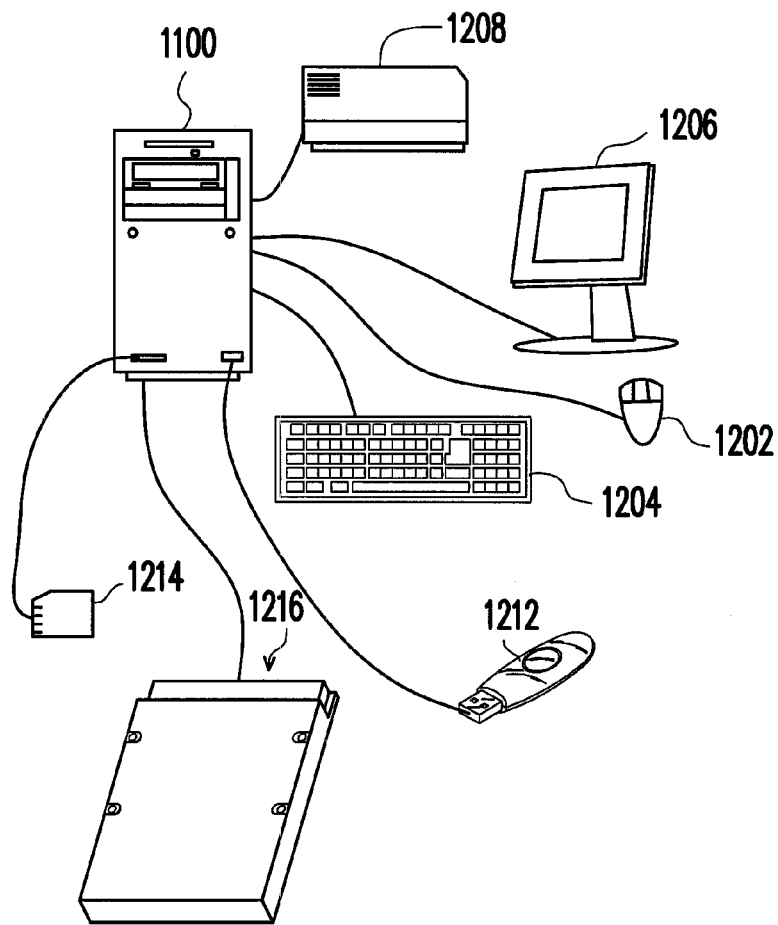
FIG. 1B is a diagram illustrating a computer, an input/output (I/O) device, and a memory storage apparatus according to the exemplary embodiment of the invention.

Referring to FIG. 1A, a host system 1000 includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206, and a printer 1208 as shown in FIG. 1B. It should be noted that the devices in FIG. 1B do not limit the I/O device 1106; the I/O device 1106 may include other devices.

In the exemplary embodiment of the invention, the memory storage apparatus 100 is coupled to the devices of the host system 1000 through the data transmission interface 1110. By using the microprocessor 1102, the random access memory (RAM) 1104 and the Input/Output (I/O) device 1106, the data can be written into the memory storage apparatus 100 or can be read from the memory storage apparatus 100. For example, the memory storage apparatus 100 may be a rewritable non-volatile memory storage apparatus, such as a flash drive 1212, a memory card 1214, or a solid state drive (SSD) 1216 shown in FIG. 1B.

Figure 1C:
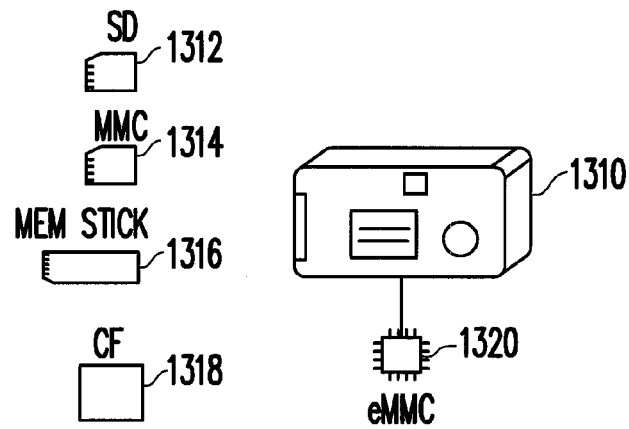
FIG. 1C is a diagram of a host system and a memory storage apparatus according to another exemplary embodiment of the invention.

Generally, the host system 1000 accompanied with the memory storage apparatus 100 can substantially be any system capable of storing data. Even though the host system 1000 is described as a computer system in the exemplary embodiment, in another exemplary embodiment of the invention, the host system 1000 may also be a system such as a digital camera, a video camera, a communication device, an audio player, or a video player. For example, if the host system is a digital camera (video camera) 1310, the rewritable non-volatile memory storage apparatus is then an SD card 1312, an MMC card 1314, a memory stick 1316, a CF card 1318 or an embedded storage device 1320 (as shown in FIG. 1C). The embedded storage device 1320 includes an embedded MMC (eMMC). It should be noted that the eMMC is directly coupled to the substrate of the host system.

Figure 2:
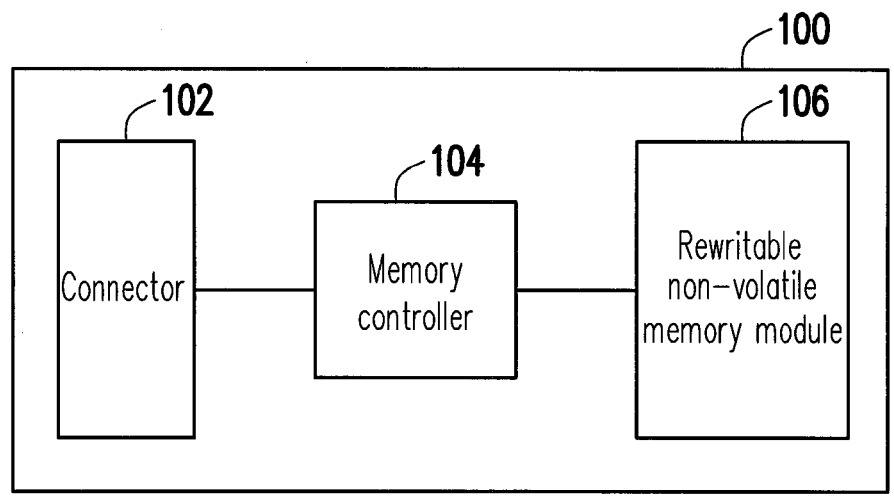
FIG. 2 is a schematic block diagram of the memory storage apparatus in FIG. 1A.

FIG. 2 is a schematic block diagram of the memory storage apparatus in FIG. 1A.

Referring to FIG. 2, the memory storage apparatus 100 includes a connector 102, a memory controller 104, and a rewritable non-volatile memory module 106.

In the exemplary embodiment, the connector 102 complies with a serial advanced technology attachment (SATA) standard. However, it should be noted that the invention is not limited to the aforementioned description and the connector 102 can also conform with an institute of electrical and electronic engineers (IEEE) 1394 standard, a peripheral component interconnect express (PCI Express) standard, a universal serial bus (USB) standard, a secure digital (SD) interface standard, a memory stick (MS) interface standard, a multi-media-card (MMC) interface standard, a compact flash (CF) interface standard, an integrated device electronics (IDE) interface standard or other suitable types of standards.

The memory controller 104 executes a plurality of logical gates or control commands implemented in a hardware form or a firmware form, and performs various data operations such as data writing, reading, and erasing in the rewritable non-volatile memory module 106 according to commands from the host system 1000. In the embodiment, the memory controller 104 manages the data stored in the rewritable non-volatile memory module 106 according to the data management method of the embodiment. The data management method according to the embodiment of the invention will be explained in detail with the drawings.

The rewritable non-volatile memory module 106 is coupled to the memory controller 104, and is configured for storing data written by the host system 1000. In the embodiment, the rewritable non-volatile memory module 106 is a multi level cell (MLC) NAND flash memory module. However, the invention is not limited thereto. The rewritable non-volatile memory module 106 may also be a single level cell (SLC) NAND flash memory module, other flash memory modules or other memory modules having the same characteristic.

Figure 3:
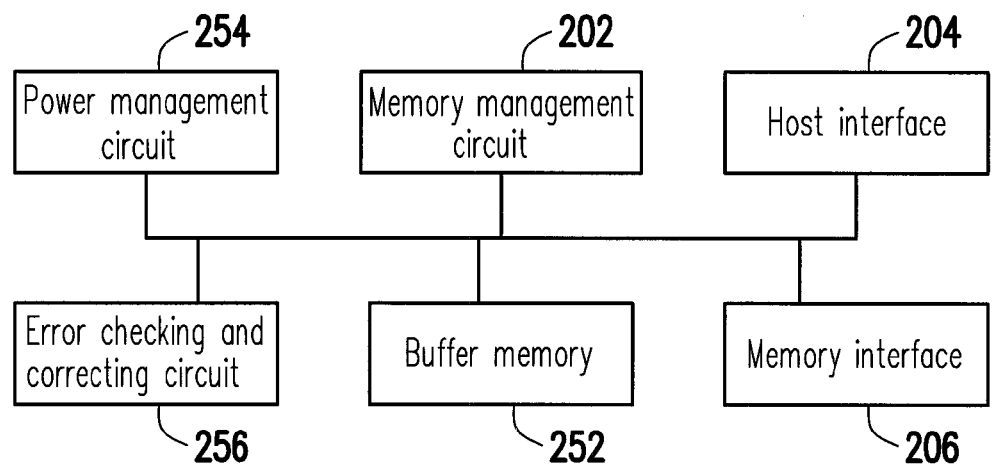
FIG. 3 is a schematic block diagram of a memory controller according to the first exemplary embodiment of the invention.

FIG. 3 is a schematic block diagram of a memory controller according to the first exemplary embodiment of the invention.

Referring to FIG. 3, the memory controller 104 includes a memory management circuit 202, a host interface 204 and a memory interface 206.

The memory management circuit 202 is configured for controlling the whole operation of the memory controller 104. To be specific, the memory management circuit 202 has a plurality of control commands, and when the memory storage apparatus 100 is operated, the control commands are executed to manage the data stored in the rewritable non-volatile memory module 106 according to the data management method of the embodiment.

In the embodiment, the control commands of the memory management circuit 202 are implemented in a firmware form. For example, the memory management circuit 202 has a micro-processor unit (not shown) and a read-only memory (not shown), and these control commands are burned in the read-only memory. When the memory storage apparatus 100 is enabled, the control commands are executed by the micro-processor unit to accomplish the data management method according to the embodiment of the invention.

In another embodiment of the invention, the control commands of the memory management circuit 202 are stored in a specific area (for example, the system area of the non-volatile memory module exclusively used for storing system data) of the rewritable non-volatile memory module 106 as program codes. Additionally, the memory management circuit 202 may have a micro-processor unit (not shown), a read-only memory (not shown) and a random access memory (not shown). Specifically, the read-only memory has a driver code, and when the memory controller 104 is enabled, the micro-processor unit executes the driver code to load the control commands stored in the rewritable non-volatile memory module 106 into the random access memory of the memory management circuit 202. Then, the micro-processor unit runs these control commands to accomplish the data management method in the embodiment of the invention. Additionally, in another embodiment of the invention, the control commands of the memory management circuit 202 may be implemented in a hardware form.

The host interface 204 is coupled to the memory management circuit 202, and is configured for receiving and identifying commands and data from the host system 1000. Namely, the commands and data from the host system 1000 are transmitted to the memory management circuit 202 through the host interface 204. In the embodiment, the host interface 204 complies with an SATA standard. However, it should be understood that the invention is not limited thereto. The host interface 204 may comply with a PATA standard, an IEEE 1394 standard, a PCI express standard, a USB standard, an SD standard, an MS standard, an MMC standard, a CF standard, an IDE standard, or other suitable data transmission standards.

The memory interface 206 is coupled to the memory management circuit 202 and is configured for accessing the rewritable non-volatile memory module 106. Namely, data to be written into the rewritable non-volatile memory module 106 is converted by the memory interface 206 into a format acceptable to the rewritable non-volatile memory module 106.

In another embodiment of the invention, the memory controller 104 also includes a buffer memory 252. The buffer memory 252 is coupled to the memory management circuit 202 and configured to temporarily store data and commands from the host system 1000 or data from the rewritable non-volatile memory module 106.

In an embodiment of the invention, the memory controller 104 also includes a power management circuit 254. The power management circuit 254 is coupled to the memory management circuit 202 and is configured for controlling the power of the memory storage apparatus 100.

In an embodiment of the invention, the memory controller 104 also includes an error checking and correcting circuit 256. The error checking and correcting circuit 256 is coupled to the memory management circuit 202, and is configured for executing an error checking and correcting procedure to ensure data accuracy. To be specific, when the memory management circuit 202 receives a write command from the host system 1000, the error checking and correcting circuit 256 generates an error checking and correcting (ECC) code for data corresponding to the write command, and the memory management circuit 202 writes the data and the corresponding ECC code into the rewritable non-volatile memory module 106. Subsequently, when the memory management circuit 202 reads the data from the rewritable non-volatile memory module 106, the memory management circuit 202 simultaneously reads the corresponding ECC code, and the error checking and correcting circuit 256 executes an ECC procedure for the read data based on the ECC code.

Figure 4:
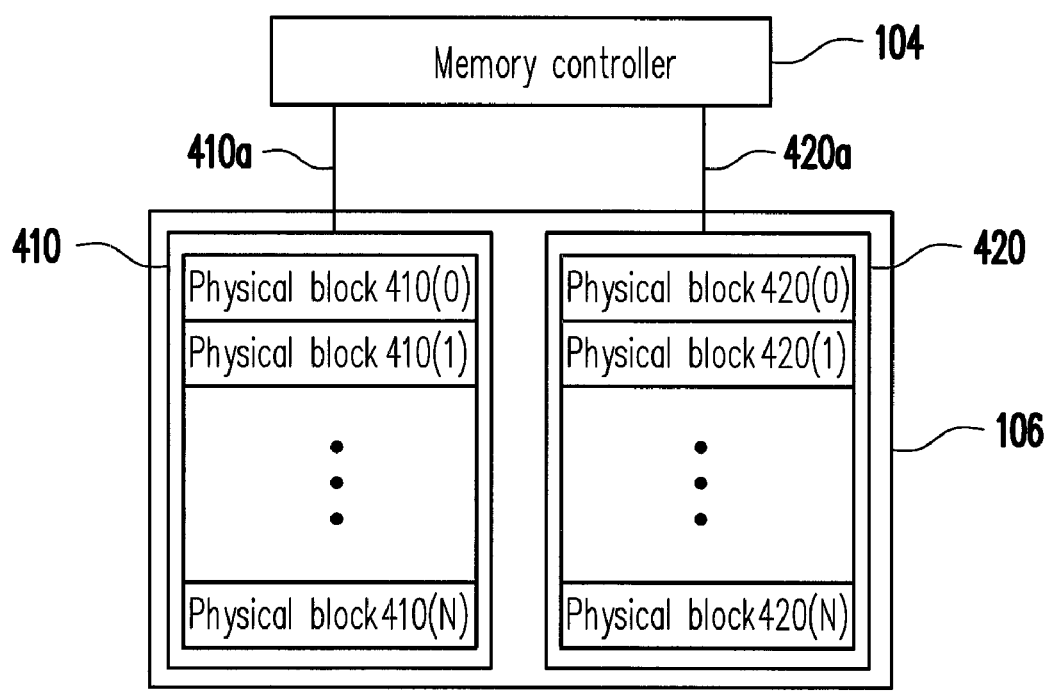
FIG. 4 is a schematic block diagram of a rewritable non-volatile memory module according to the first exemplary embodiment of the invention.

FIG. 4 is a schematic block diagram of a rewritable non-volatile memory module according to the first exemplary embodiment of the invention.

Referring to FIG. 4, the rewritable non-volatile memory module 106 includes a first memory sub-module 410 and a second memory sub-module 420. For example, the first memory sub-module 410 and the second memory sub-module 420 are respectively memory dies. The first memory sub-module 410 has the physical blocks 410(0)~410(N), and the second memory sub-module 420 has the physical blocks 420(0)~420(N). For example, the first memory sub-module 410 and the second memory sub-module 420 are respectively coupled to the memory controller 104 via a data bus 410a and a data bus 420a individually. However, it should be noted that in another embodiment of the invention, the first memory sub-module 410 and the second memory sub-module 420 can also be coupled to the memory controller 104 via just one data bus. Each physical block of the first memory sub-module 410 and the second memory sub-module 420 respectively have a plurality of physical pages, and each physical page has at least one physical sector, wherein the physical pages belonging to the same physical block may be written individually and must be erased simultaneously. For example, each physical block is form with 128 physical pages, and each physical page has 8 physical sectors. Namely, when a size of each physical sector is 512 bytes, for example, each physical page has a capacity of 4 kilobytes. However, it should be noticed that the invention is not limited thereto. Each physical block may have 64 physical pages, 256 physical pages, or any other amount of physical pages.

In detail, each physical block is the smallest erasing unit. Namely, each physical block contains the least number of memory cells that are erased together. And, one physical page is the smallest programming unit. Namely, each physical page is the smallest unit for writing data. However, it should be noted that in another embodiment of the invention, the smallest unit for writing data can also be a physical sector or another size.

Each physical page usually includes a data bit area and a redundant bit area. The data bit area is used for storing user data, and the redundant bit area is used for storing system data (for example, the ECC code).

It is to be noted that the description of this embodiment is based on the example that the rewritable non-volatile memory module 106 includes 2 memory sub-modules, but the invention is not limited thereto. In another embodiment of the invention, the rewritable non-volatile memory module 106 includes 4 or 8 memory sub-modules.

Figure 5A:
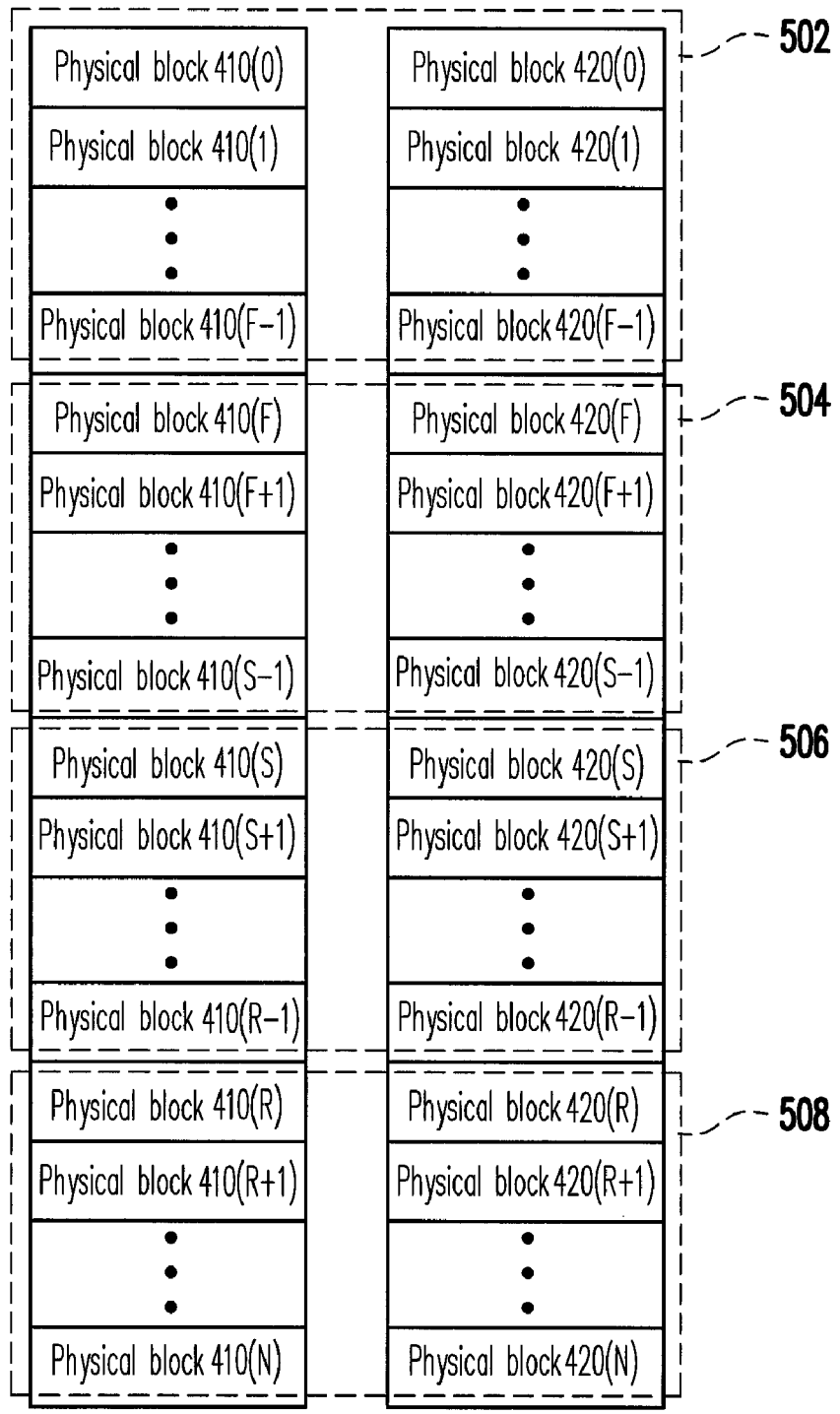
FIGS. 5A and 5B are exemplary diagrams of managing a physical block according to the first exemplary embodiment of the invention.
Figure 5B:
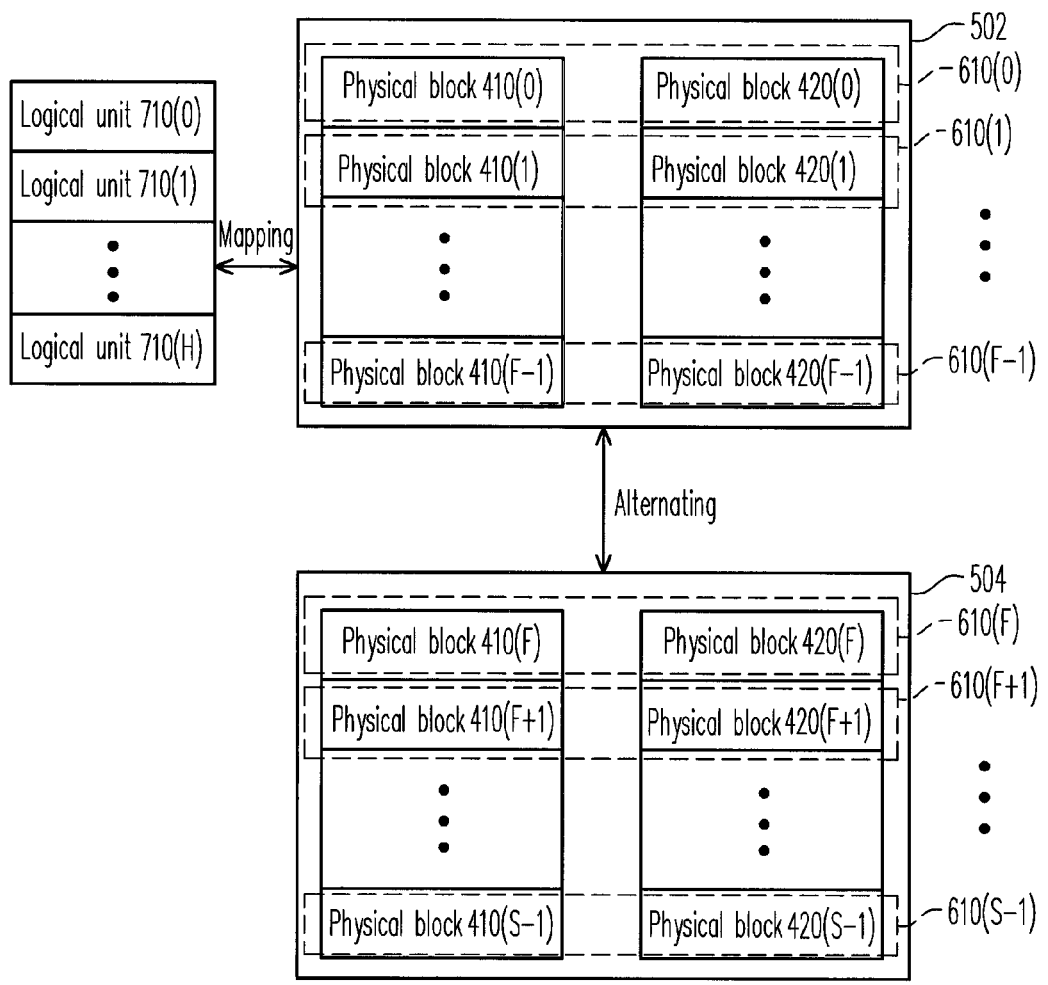

FIGS. 5A and 5B are exemplary diagrams of managing a physical block according to the first exemplary embodiment of the invention.

Referring to FIG. 5A, the memory management circuit 202 of the memory controller 104 logically groups the physical blocks 410(0)~410(N) and the physical blocks 420(0~420(N) into a data area 502, a free area 504, a system area 506 and a replacement area 508.

The physical blocks of the data area 502 and the free area 504 are used for storing data written by the host system 1000. To be specific, the physical blocks of the data area 502 are physical blocks which have stored data, and the physical blocks of the free area 504 are physical blocks used for substituting the physical blocks of the data area 502. Namely, when the host system 1000 receives write commands and desired written data, the memory management circuit 202 gets a physical block from the free area 504, and writes the data into the gotten physical block to substitute the physical blocks of the data area 502.

The physical blocks logically belonging to the system area 506 are used for recording system data. For example, the system data includes information such as the manufacturer and model relating to the rewritable non-volatile memory module, the number of physical blocks in the rewritable nonvolatile memory module, and the number of physical pages in each physical block.

The physical blocks logically belonging to the replacement area 508 are used for a bad physical blocks replacing process to replace damaged physical blocks (also referred to as "bad physical blocks"). In detail, if there are still normal physical blocks in the replacement area 508 and a physical block in the data area 502 is damaged, the memory management circuit 202 gets a normal physical block from the replacement area 508 for replacing the bad physical block. It should be noted that in the embodiment, the memory management circuit 202 replaces the bad physical blocks in the first memory sub-module 410 with the normal physical blocks which are in the replacement area 508 and belong to the first memory sub-module 410, and replaces the bad physical blocks in the second memory sub-module 420 with the normal physical blocks which are in the replacement area 508 and belong to the second memory sub-module 420. Thus, when the memory management circuit 202 executes write commands, it may simultaneously use the data bus 410a and the data bus 420a to write data in a parallel manner.

Referring to FIG. 5B, the memory management circuit 202 groups the physical blocks 410(0)~410(S-1) and the physical blocks 420(0)~420(S-1) of the data area 502 and the free area 504 to a plurality of physical units, and manages the physical blocks in units of each physical unit. For example, the physical blocks 410(0)~410(S-1) and the physical blocks 420(0)~420(S-1) are paired and grouped into the physical units 610(0)~610(S-1). In the exemplary embodiment, each physical unit is composed of 2 physical blocks which respectively belongs to different memory sub-modules. Nevertheless, it should be understood that the invention is not limited thereto. In another embodiment, each physical unit is composed of one physical block. That is, the memory management circuit 202 manages the physical blocks in units of each physical block. In another embodiment, each physical unit may also be composed of at least one physical block in the same memory sub-module or different memory sub-modules.

In addition, the memory management circuit 202 configures logical units 710(0)~710(H) for mapping the physical units of the data area 502, wherein each logical unit includes a plurality of logical pages sequentially mapping the physical pages of the corresponding physical unit, and each logical page has a plurality of logical sectors for mapping the physical sectors of the corresponding physical page. In the exemplary embodiment, the memory management circuit 202 maintains a logical unit-physical unit mapping table for recording the mapping relationship between the logical units 710(0)~710(H) and the physical units of the data area 504. For example, when the host system 1000 wants to access a logical access address, the memory management circuit 202 can convert the logical access address that the host system 1000 accessed into an address composed of the corresponding logical unit, the corresponding logical page, and the corresponding logical sector, and access data at the corresponding physical page of the physical unit through the logical unit-physical unit mapping table.

In the embodiment, the memory management circuit 202 gets the physical units from the free area 504 to be global random units, and the data (also referred to as update data) corresponding to the write commands from the host system 1000 are written into the global random units. In the embodiment, the global random units are used to respectively store data corresponding to different logical units in at least the same physical block.

Specifically, when the memory storage apparatus 100 receives write commands from the host system 1000, data in the write commands from the host system 1000 can be sequentially written into a global random unit. And, when the global random unit is full, the memory management circuit 202 will again get a physical unit from the free area 504 to be another global random unit, in order to continue to write update data corresponding to the writing commands of the host system 1000. Once the number of the physical units regarded as global random units reaches an upper limit value, the memory management circuit 202 will perform a data merging process, so the data stored in the global random units will become invalid data, and associates the global random units only storing invalid data with the free area 504.

FIGS. 6A~6G are diagrams illustrating examples of writing data according to the first embodiment of the invention.

For ease of description, here it is assumed the data area 502 has 5 physical units, the free area 504 has 3 physical units, and each physical unit has 3 physical pages. Data desired to be written in each physical unit must be written in according to the order of the physical pages, and the upper limit value is 3.

Figure 6A:
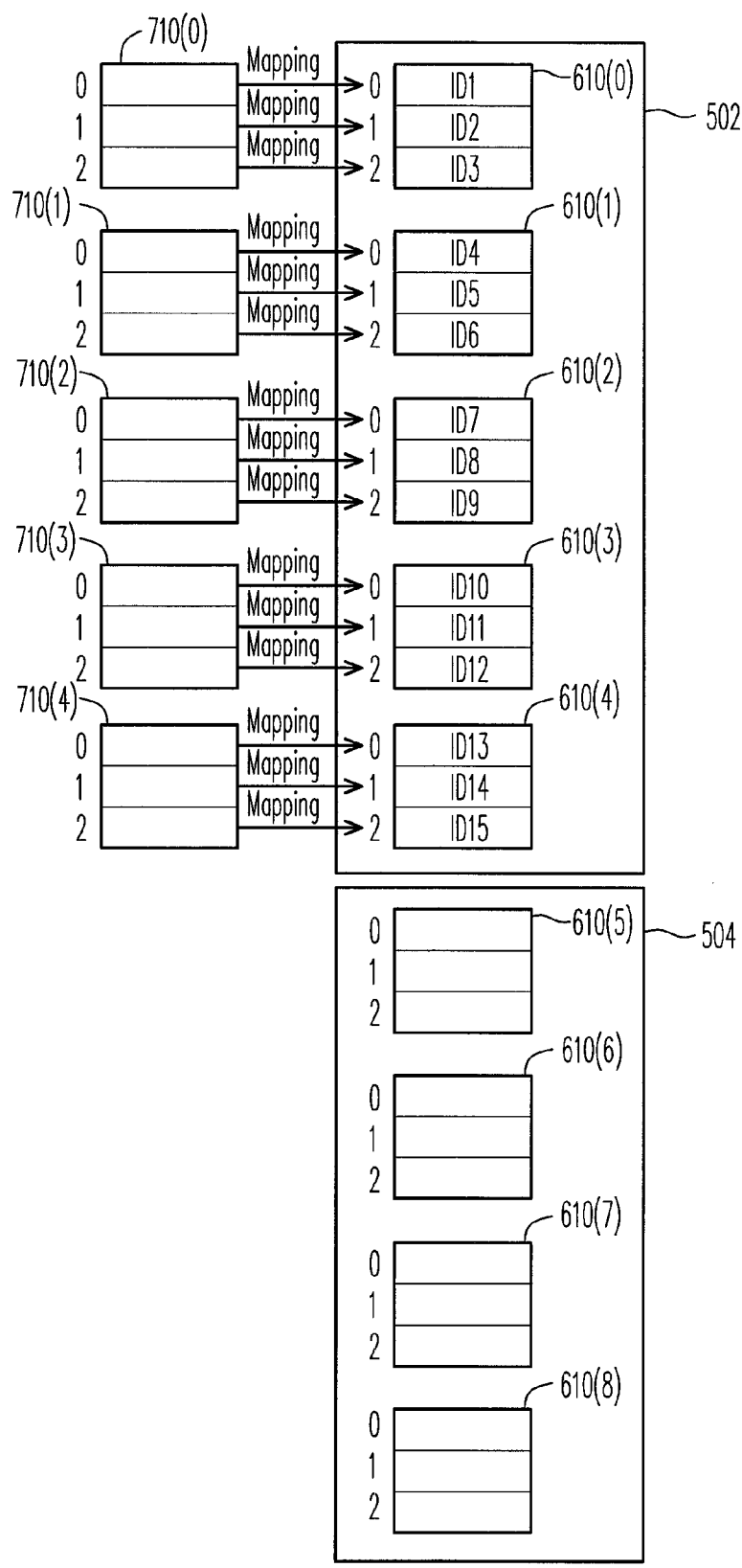
FIGS. 6A~6G are diagrams illustrating examples of writing data according to the first embodiment of the invention.

Referring to FIG. 6A, in the initial state of the memory storage apparatus 100, the logical pages of the logical units 710(0)~710(4) may sequentially map to the physical pages of the physical units 610(0)~610(4) of the data area 502, and the free area 504 has the physical units 610(5)~610(7). Namely, the memory management circuit 202 will record a mapping relationship between the logical units 710(0)~710(4) and the physical units 610(0)~610(4) in the logical unit-physical unit mapping table, and the physical pages of the physical units 610(0)~610(4) are considered the physical pages storing data (i.e. initial data ID1~ID15) belonging to the logical pages of the logical units 710(0)~710(4). It should be noted that when the memory storage apparatus 100 has just been manufactured, the initial data ID1~ID15 may be null data. In addition, the memory management circuit 202 may record available physical units 610(5)~610(8) that are in the free area 504.

Figure 6B:
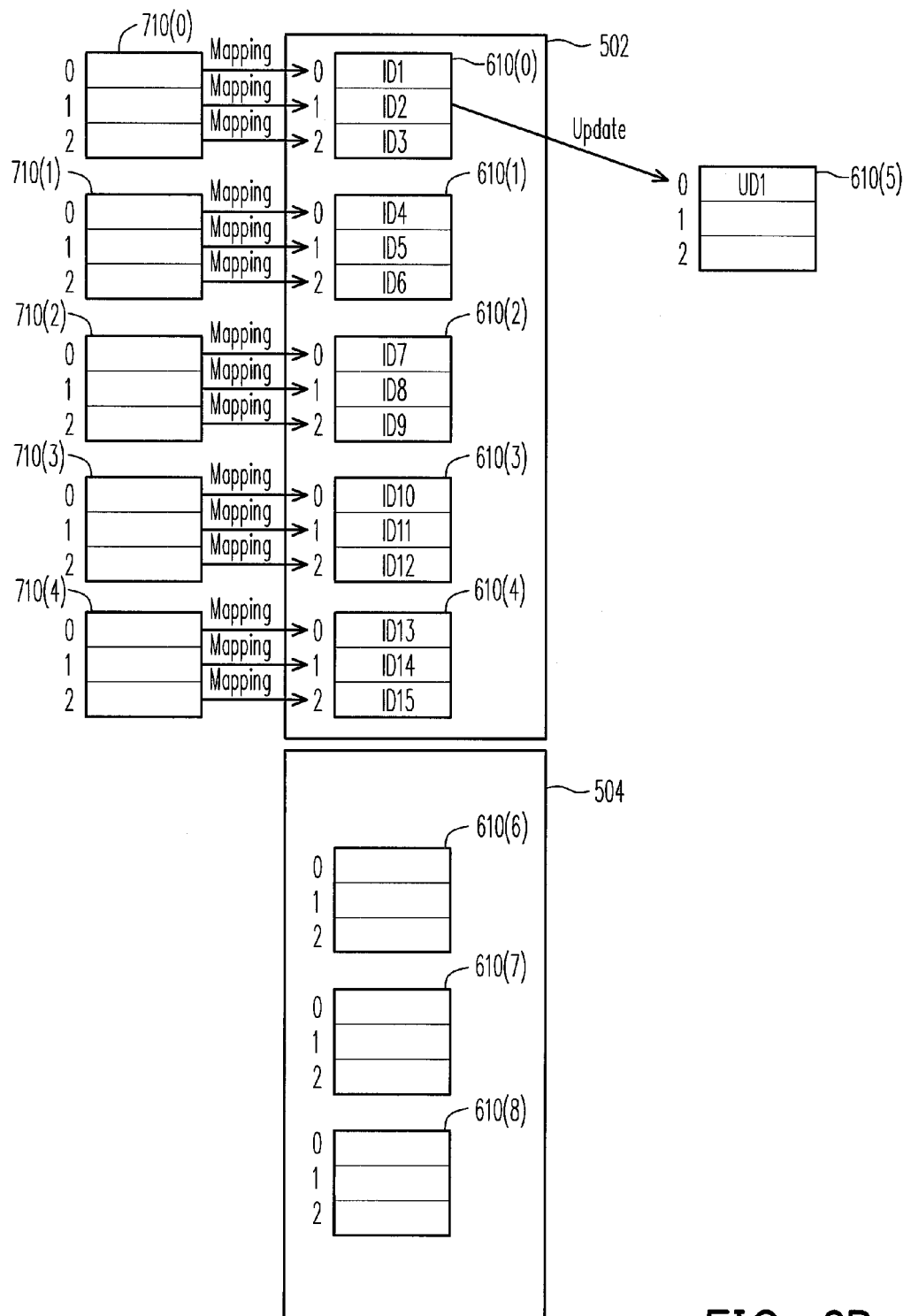

Referring to FIG. 6B, when an update data UD1 is desired to be programmed and the update data UD1 belongs to the $1^{st}$ logical page of the logical unit 710(0), the memory management circuit 202 may get the physical unit 610(5) from the free area 504 to be a first global random unit and give the programming command so the update data UD1 is written into the $0^{th}$ physical page of the physical unit 610(5).

Figure 6C:
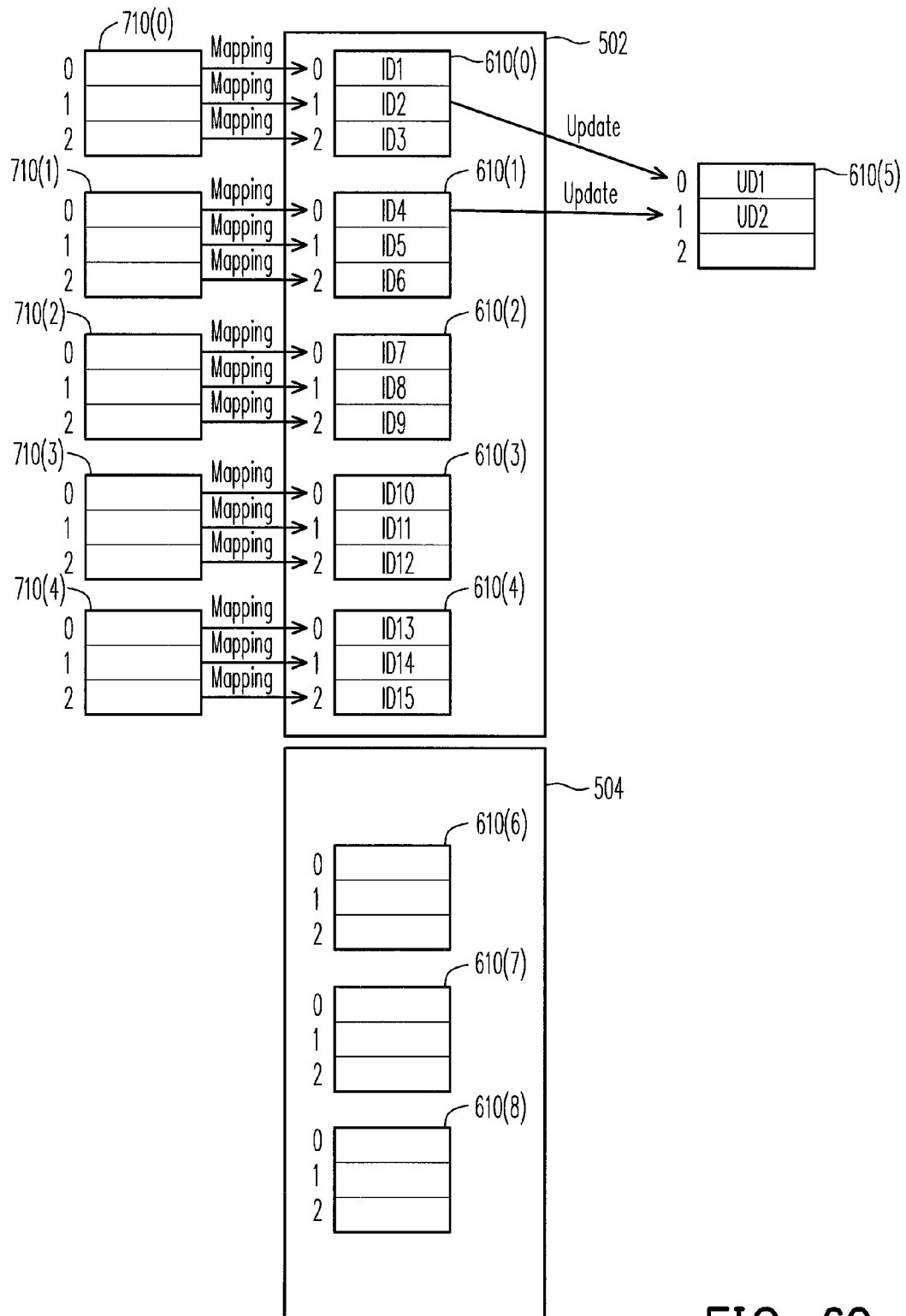

Referring to FIG. 6C, following FIG. 6B, when an update data UD2 is desired to be programmed and the update data UD2 belongs to the $0^{th}$ logical page of the logical unit 710(1), the memory management circuit 202 gives the programming command so the update data UD2 is written into the $1^{st}$ physical page of the physical unit 610(5).

Figure 6D:
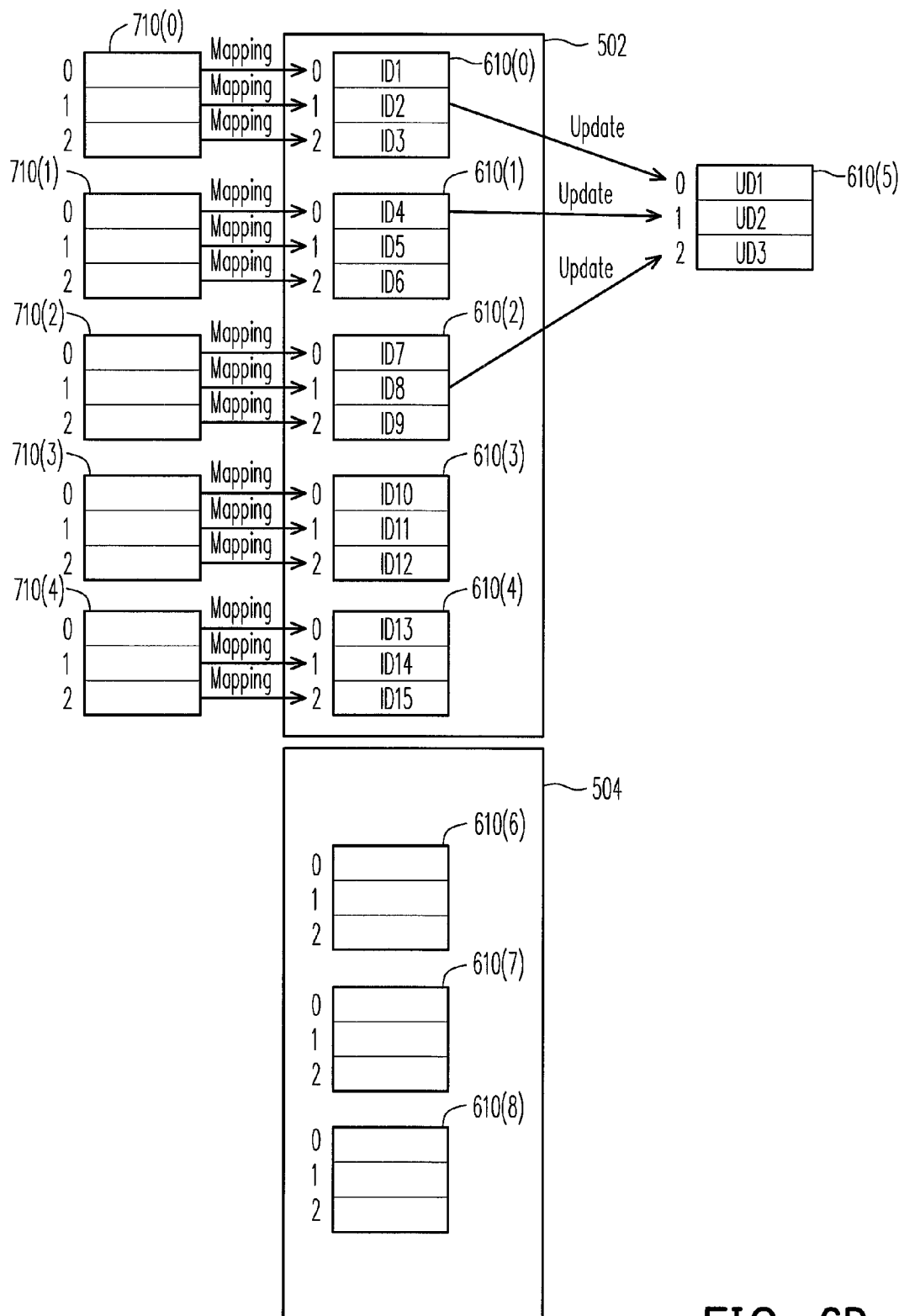

Referring to FIG. 6D, following FIG. 6C, when an update data UD3 is desired to be programmed and the update data UD3 belongs to the $1^{st}$ logical page of the logical unit 710(2), the memory management circuit 202 gives the programming command so the update data UD3 is written into the $2^{nd}$ physical page of the physical unit 610(5).

Figure 6E:
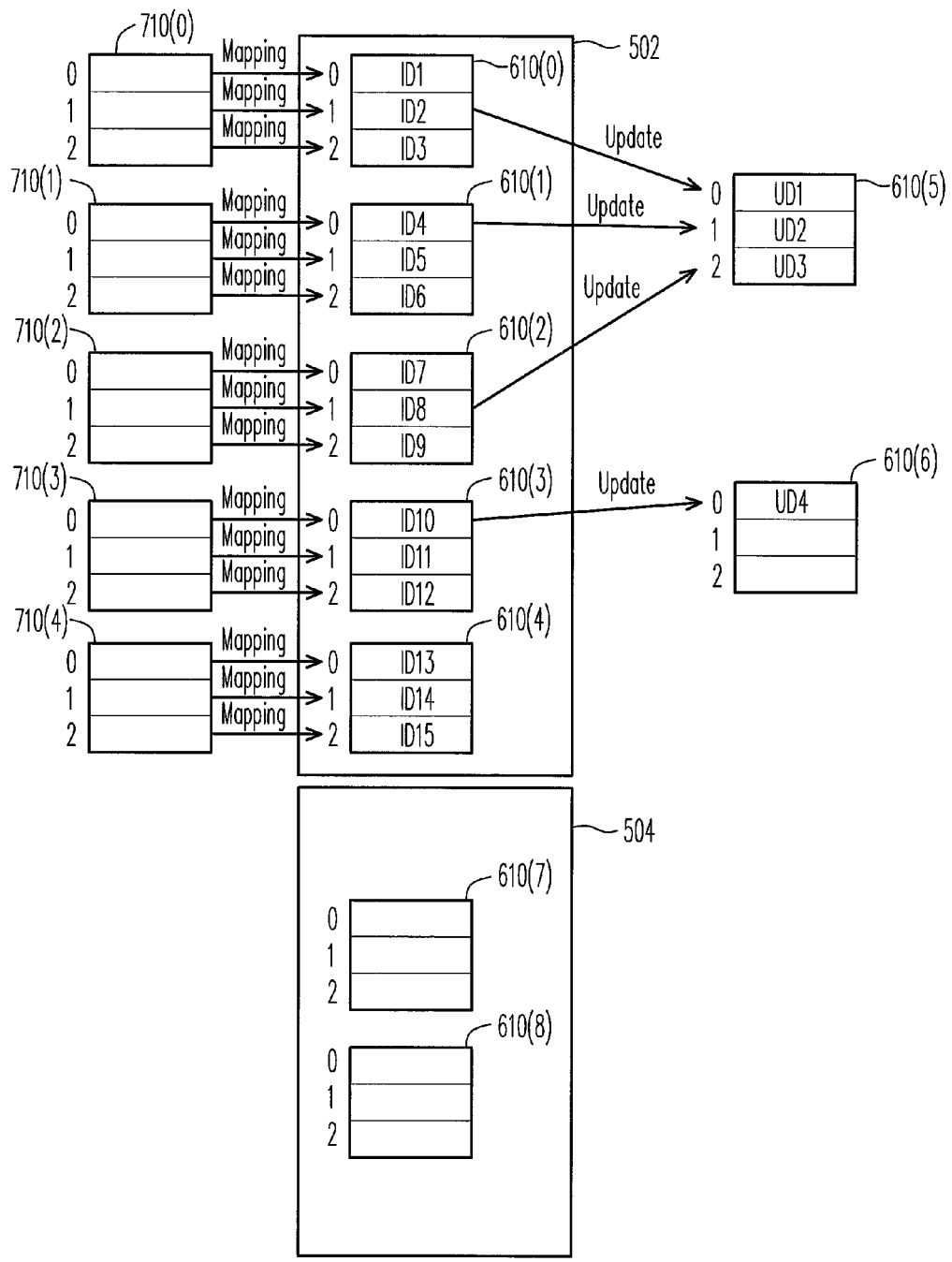

Referring to FIG. 6E, following 6D, when an update data UD4 is desired to be programmed and the update data UD4 belongs to the $0^{th}$ logical page of the logical unit 710(3), since the first global random unit 610(5) has no storage space, thus, the memory management circuit 202 gets the physical unit 610(6) from the free area 504 to be a second global random unit and gives the programming command so the update data UD4 is written into the $0^{th}$ physical page of the physical unit 610(6).

Figure 6F:
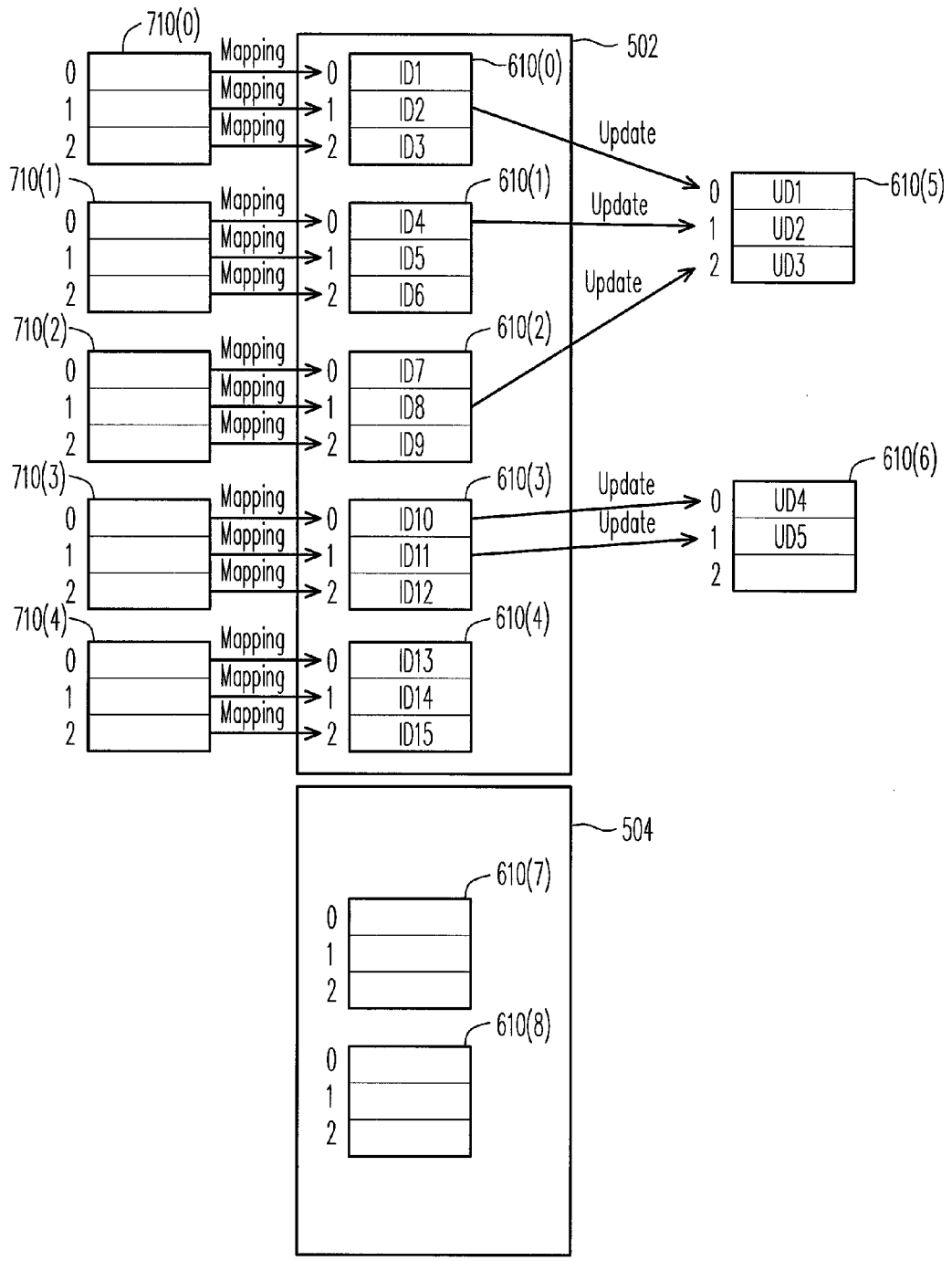

Referring to FIG. 6F, following FIG. 6E, when an update data UD5 is desired to be programmed and the update data UD5 belongs to the $1^{st}$ logical page of the logical unit 710(3), the memory management circuit 202 gives the programming command so the update data UD5 is written into the $1^{st}$ physical page of the physical unit 610(6).

Figure 6G:
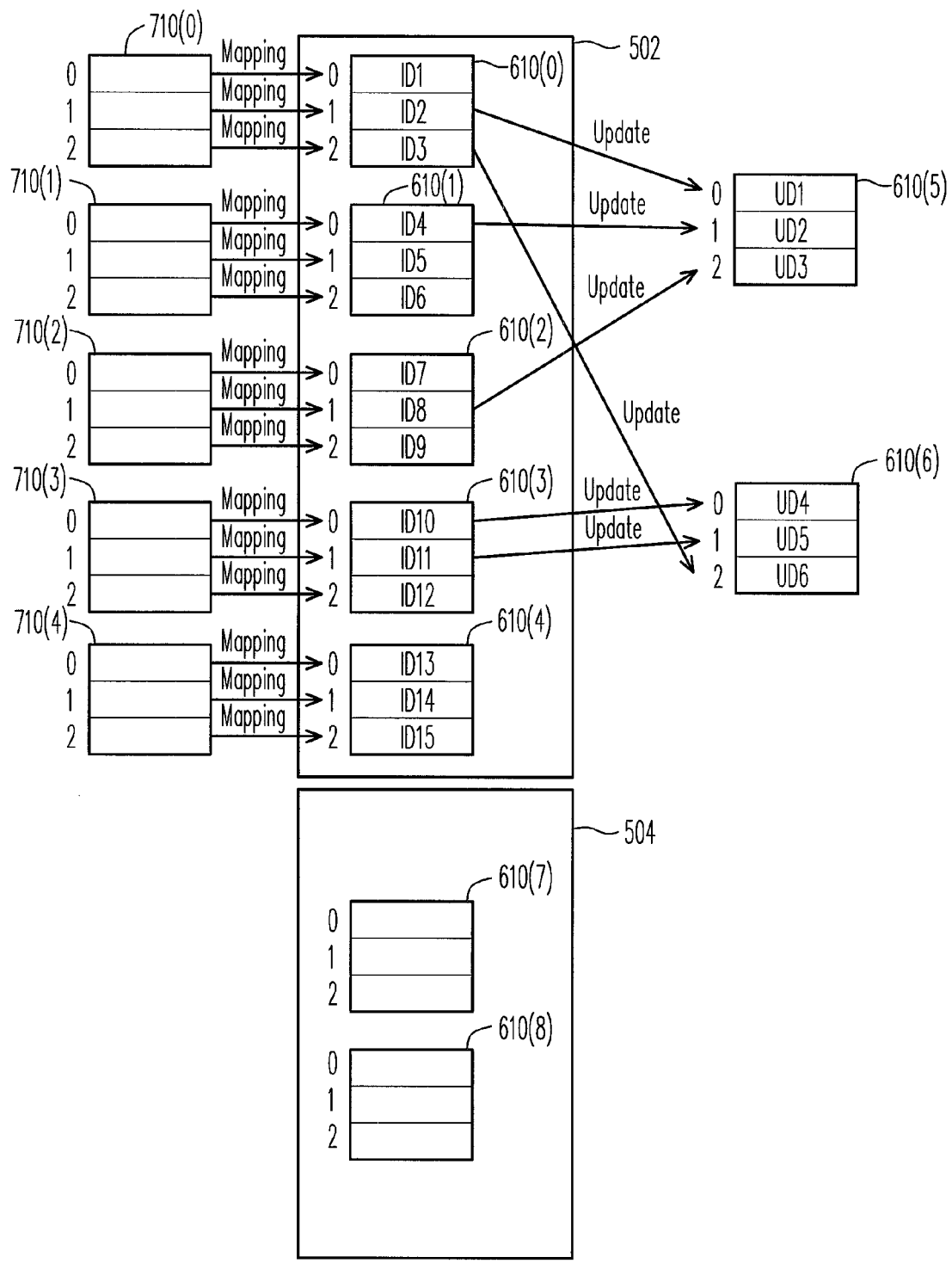

Referring to FIG. 6G, following FIG. 6F, when an update data UD6 is desired to be programmed and the update data UD6 belongs to the $2^{nd}$ logical page of the logical unit 710(0), the memory management circuit 202 gives the programming command so the update data UD6 is written into the $2^{nd}$ physical page of the physical unit 610(6).

Similarly, the memory management circuit 202 will sequentially write update data from the host system 1000 into the physical unit regarded as the global random unit. In particular, when the amount of the global random units is equal to 3, the memory management circuit 202 may perform a data merging process when executing a write commands, to avoid exhausting the physical units of the free area.

Figure 6H:
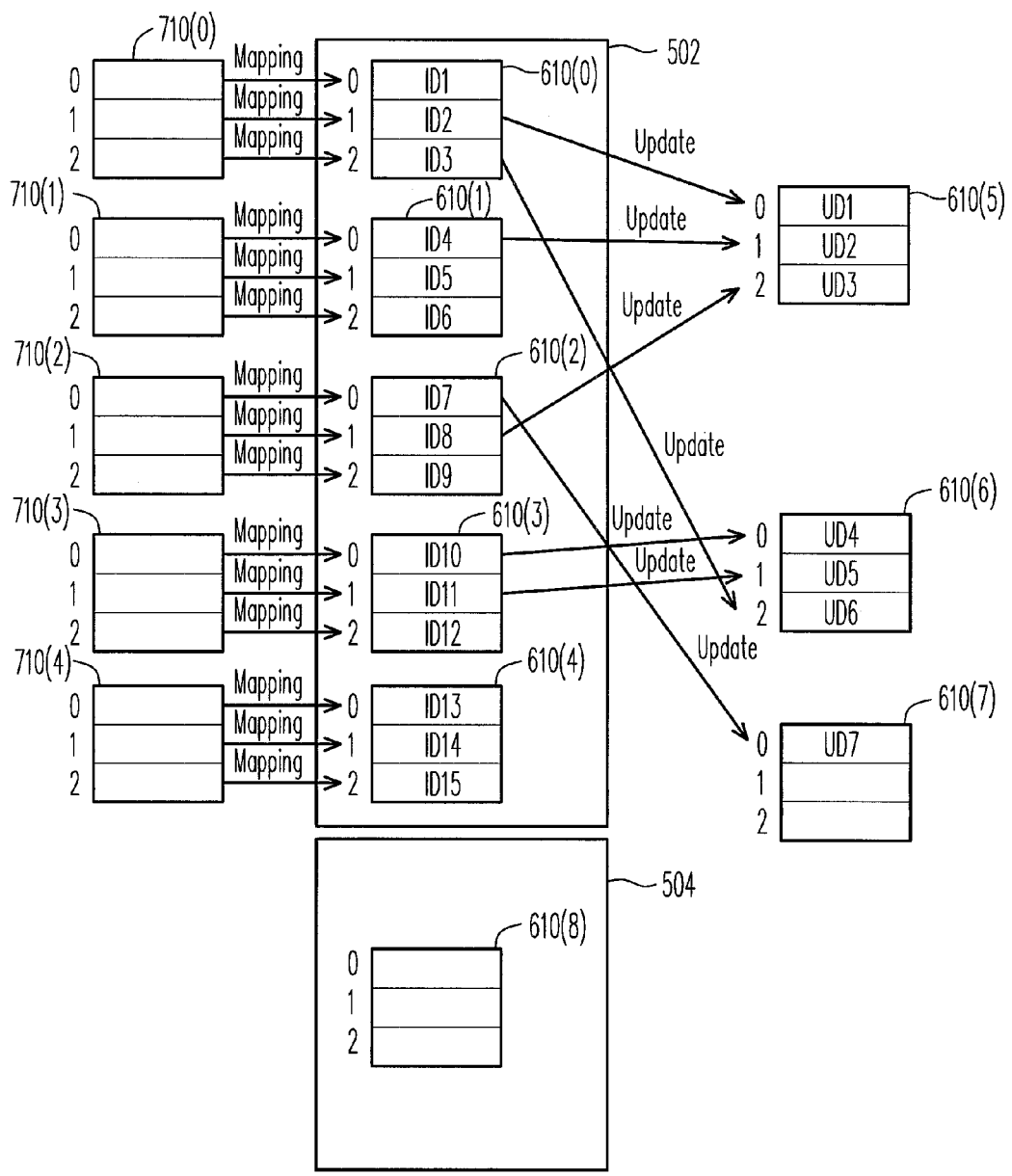
FIGS. 6H and 6I are diagrams illustrating examples of writing data and performing a data merging process according to the first exemplary embodiment of the invention.
Figure 6I:
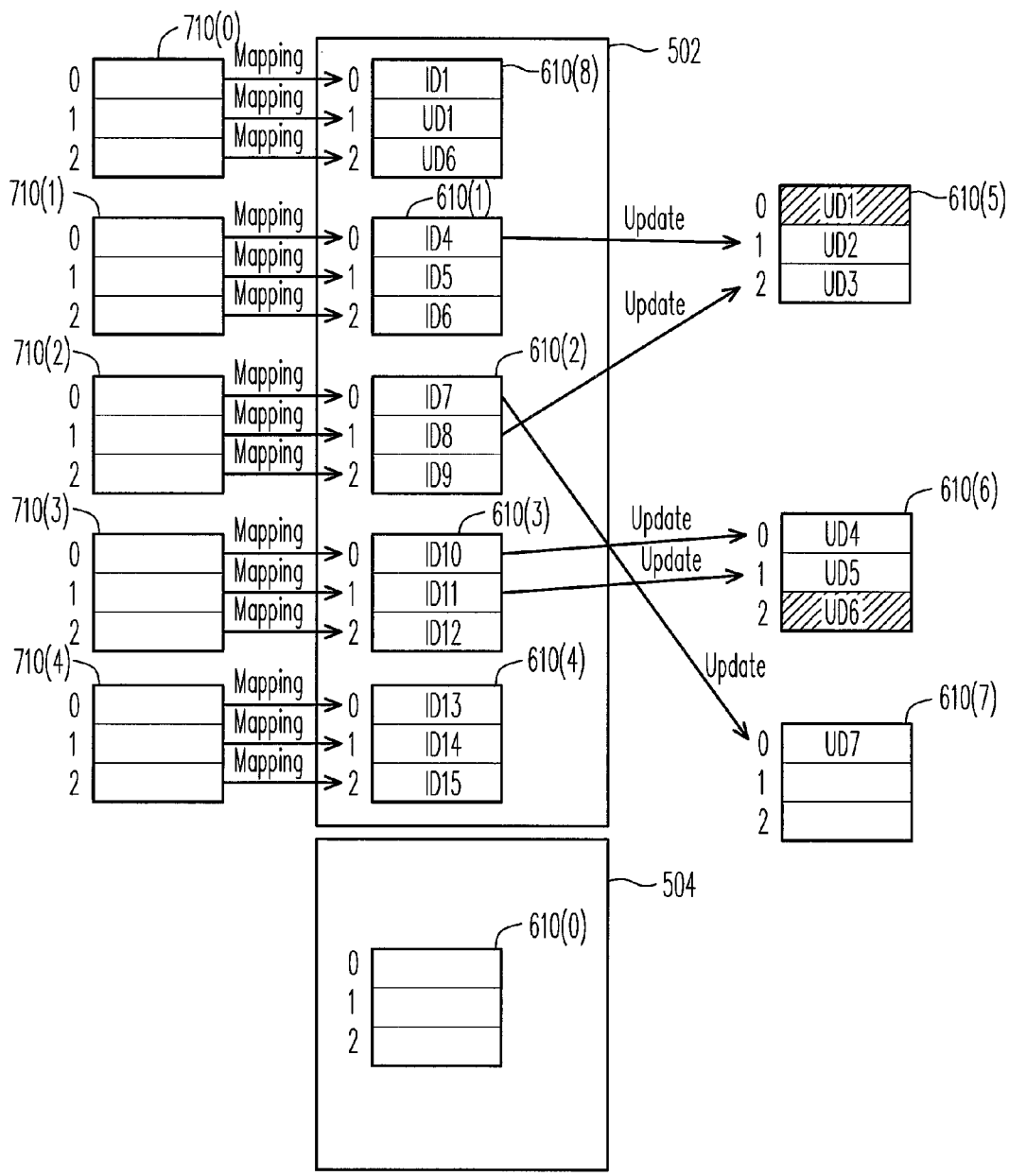

FIGS. 6H and 6I are diagrams illustrating examples of writing data and performing a data merging process according to the first exemplary embodiment of the invention.

Referring to FIG. 6H, following 6G, when an update data UD7 is desired to be programmed and the update data UD7 belongs to the $0^{th}$ logical page of the logical unit 710(2), since the second global random unit 610(6) has no storage space, thus, the memory management circuit 202 gets the physical unit 610(7) from the free area 504 to be a third global random unit and gives the programming command so the update data UD7 is written into the $0^{th}$ physical page of the physical unit 610(7). In particular, since the amount of physical units of the global random unit currently is 3, the memory management circuit 202 will perform the data merging process when writing data as illustrated in FIG. 6H. Namely, in the example, when executing the write command, the memory management circuit 202 will also perform the data merging process.

Referring to FIG. 6I, when the memory management circuit 202 chooses the logical unit 710(0) to perform the data merging process, the memory management circuit 202 identifies that the logical unit 710(0) maps to the physical unit 610(0), gets the physical unit 610(8) from the free area 504, and copies the valid data belonging to the logical unit 710(0) in the physical unit 610(0) and the global random units into the physical unit 610(8). To be specific, the memory management circuit 202 sequentially writes the data ID1 of the physical unit 610(0), the data UD1 of the physical unit 610(5), and the data UD6 of the physical unit 610(6) into the $0^{th}$~$2^{nd}$ physical pages of the physical unit 610(8), and marks the $0^{th}$ physical page of the physical unit 610(5) and the $2^{nd}$ physical page of the physical unit 610(0) as invalid pages (shown with slanted lines). Then, the memory management circuit 202 may perform an erasing operation on the physical unit 610(0), re-map the logical unit 710(0) to the physical unit 610(8) in the logical unit-physical unit mapping table, and associate the physical unit 610(0) with the free area 504.

For example, when performing the next write command, the memory management circuit 202 may perform the data merging process on the logical unit 710(1), and then when performing the next write command, the memory management circuit 202 may perform the data merging process on the logical unit 710(2). Thus, when the storage space of the physical unit 610(7) is filled, the data in the physical unit 610(5) will become invalid data. Accordingly, the memory management circuit 202 can perform the erasing operation on the physical unit 610(5), and when the physical unit 610(5) is erased, the erased physical unit 610(5) is associated with the free area 504.

Or, for example, when performing the next writing command, the memory management circuit 202 may perform the data merging process on the logical unit 710(3). Thus, before the storage space of the physical unit 610(7) is filled, the data in the physical unit 610(6) will become invalid data. Accordingly, the memory management circuit 202 may perform the erasing operation on the physical unit 610(6), and when the physical unit 610(6) is erased, the erased physical unit 610(5) is associated with the free area 504.

Thus, according to the aforementioned operation, the memory management circuit 202 may continue to associate the physical unit only stored invalid data with the free area 504, and get a physical unit from the free area 504 to be a global random unit.

As described above, when performing the data merging process, the memory management circuit 202 must search the valid data belonging to a logical unit, that is performed with the data merging process, in all the global random units. The search speed has considerable influence towards the effectiveness of the memory storage apparatus 100. In the embodiment, the memory management circuit 202 further builds a global random unit search table, so as to benefit the search of valid data. In the global random unit search table, the memory management circuit 202 builds a plurality of root units and configures an entry chain on each of the root units. In particular, the memory management circuit 202 groups the logical pages of the logical units to respectively correspond to one of the root units, and record the update information of the logical pages on the entry chain corresponding to the root unit. Accordingly, when searching for update information of a specific logical unit in the global random unit, only the entry chain corresponding to the root unit needs to be searched, thereby effectively increasing the search speed.

For example, in the exemplary embodiment, the memory management circuit 202 makes the logical pages of each logical unit to respectively correspond to the same root unit. Namely, the logical pages of the same logical unit correspond to the same root unit. It should be noted that the invention is not limited thereto. For example, in another embodiment of the invention, a portion of the logical pages of a logical unit may also be grouped to a root unit, and the other portion of the logical pages of the logical unit is grouped to another root unit.

In addition, the memory management circuit 202 respectively configures an entry chain for each root unit, and when executing a write commands, the memory management circuit 202 builds an entry on the corresponding entry chain to record update information relating to the write command. For example, each entry comprises a first field and a second field. The first field records an address of the updated logical pages, and the second field is used to record a physical address storing update data belonging to the updated logical pages.

Figure 7A:
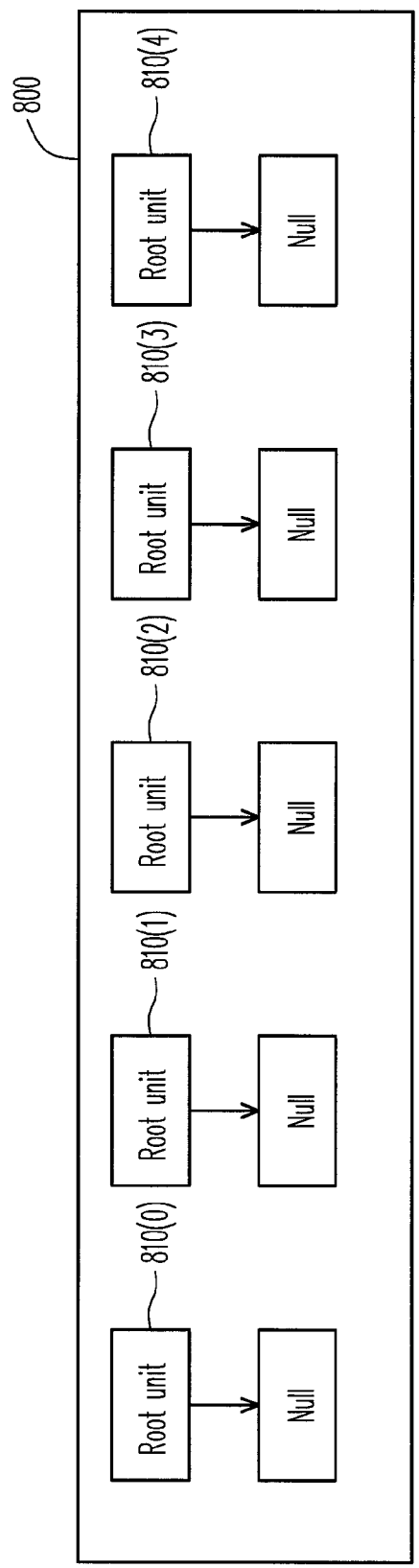
FIG. 7A is a diagram illustrating an example of a global random unit search table according to FIG. 6A.

FIG. 7A is a diagram illustrating an example of a global random unit search table according to FIG. 6A.

Referring to FIG. 7A, the global random unit search table 800 includes the root units 810(0)~810(4), wherein the logical pages of the logical unit 710(0) correspond to the root unit 810(0), the logical pages of the logical unit 710(1) correspond to the root unit 810(1), the logical pages of the logical unit 710(2) correspond to the root unit 810(2), the logical pages of the logical unit 710(3) correspond to the root unit 810(3), and the logical pages of the logical unit 710(4) correspond to the root unit 810(4). When the memory storage apparatus 100 is initiated and no data is currently stored in the global random unit, the entry chain of the root units 810(0)~810(4) respectively only includes one null entry to show that the entry chain has no valid entries. For example, when reading data belonging to the $0^{th}$ logical page of the logical unit 710(0), the memory management circuit 202 identifies that the $0^{th}$ logical page of the logical unit 710(0) is not updated according to the entry chain of the root unit 810(0), the data can be read directly from the corresponding physical page of the physical unit according to the logical unit-physical unit mapping table information.

Figure 7B:
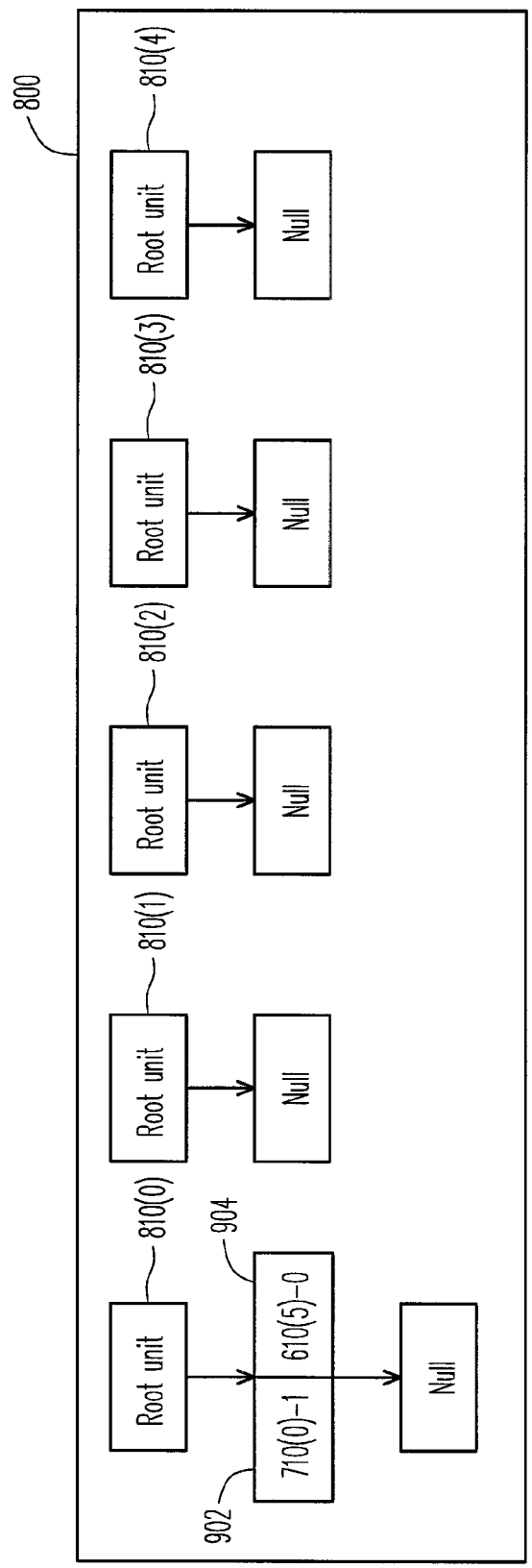
FIG. 7B is a diagram illustrating an example of a global random unit search table according to FIG. 6B.

FIG. 7B is a diagram illustrating an example of a global random unit search table according to FIG. 6B.

Referring to FIG. 7B, when performing the writing operation illustrated in 6B, since the $1^{th}$ logical page of the logical unit 710(0) became an updated logical page (i.e. the update information corresponding to the logical pages is already stored in the global random unit), thus, the memory management circuit 202 adds 1 entry in the entry chain of the root unit 810(0), wherein the first field 902 of the entry will record information relating to the $1^{th}$ logical page of the logical unit 710(0) (i.e. "710(0)-1"), and the second field 904 of the entry will record information relating to the $0^{th}$ physical page of the physical unit 610(5) (i.e. "610(5)-0").

Figure 7C:
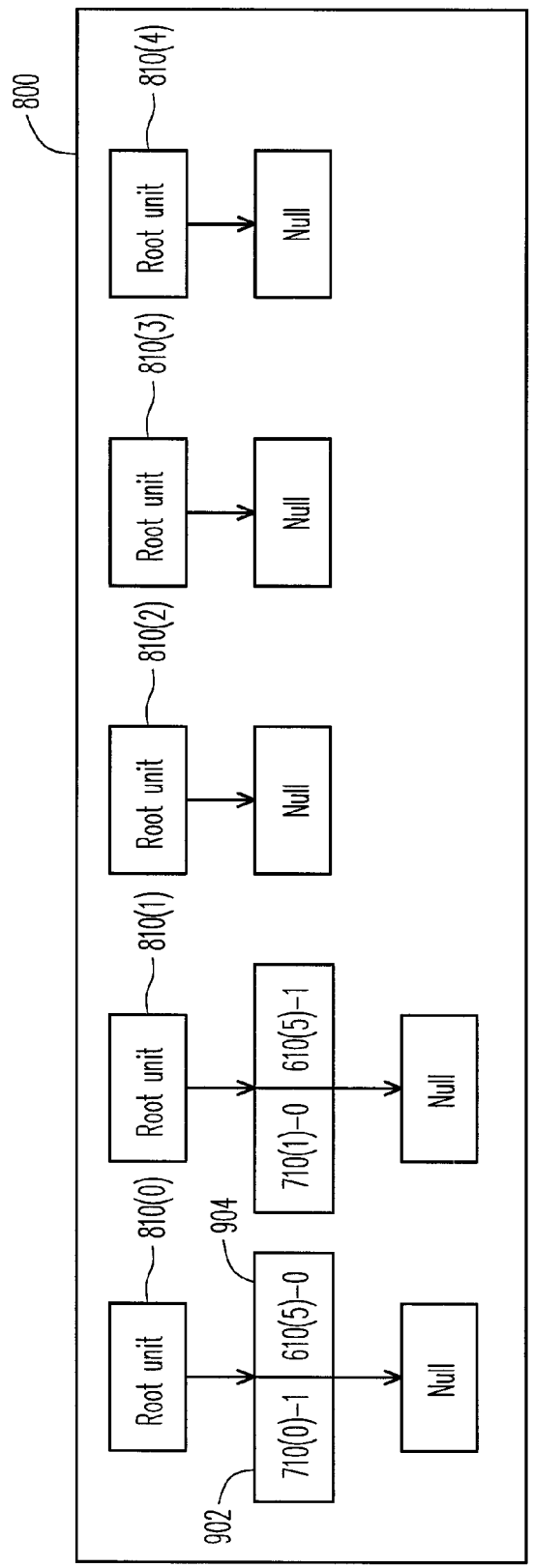
FIG. 7C is a diagram illustrating an example of a global random unit search table according to FIG. 6C.

FIG. 7C is a diagram illustrating an example of a global random unit search table according to FIG. 6C.

Referring to FIG. 7C, when performing the writing operation illustrated in 6C, since the $0^{th}$ logical page of the logical unit 710(1) became an updated logical page, thus, the memory management circuit 202 adds 1 entry in the entry chain of the root unit 810(1), wherein the first field of the entry will record information relating to the 0th logical page of the logical unit 710(1) (i.e. "710(1)-0"), and the second field of the entry will record information relating to the $1^{st}$ physical page of the physical unit 610(5) (i.e. "610(5)-1").

Figure 7D:
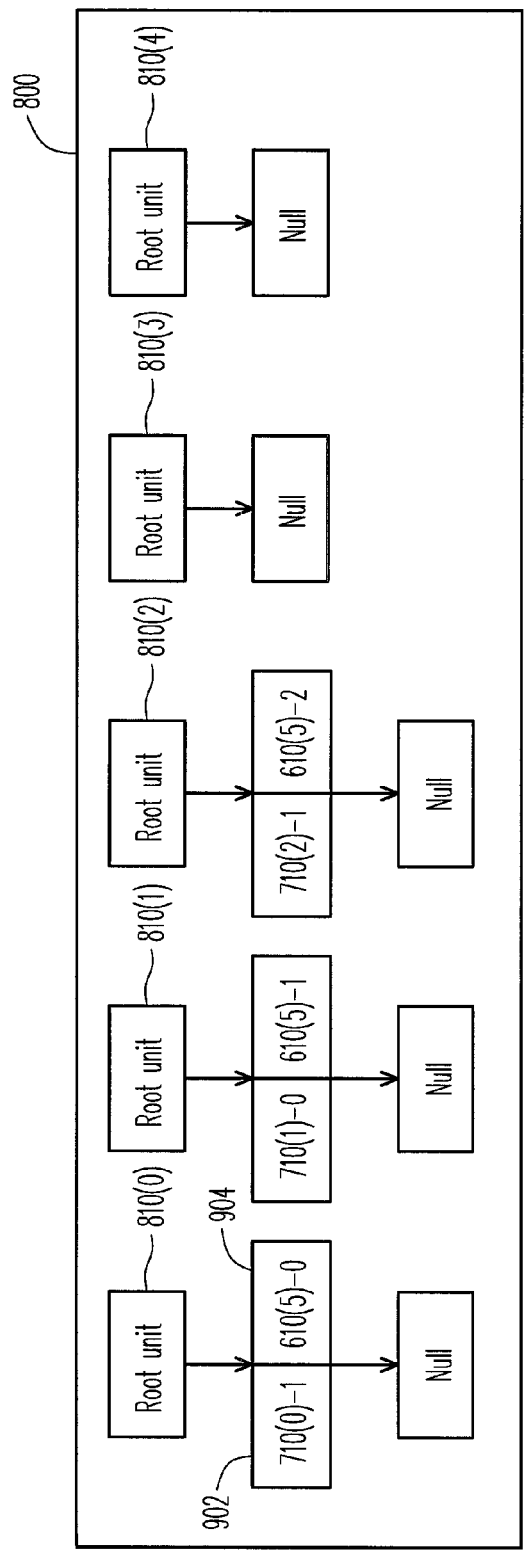
FIG. 7D is a diagram illustrating an example of a global random unit search table according to FIG. 6D.

FIG. 7D is a diagram illustrating an example of a global random unit search table according to FIG. 6D.

Referring to FIG. 7D, when performing the writing operation illustrated in 6D, since the $1^{st}$ logical page of the logical unit 710(2) became an updated logical page, thus, the memory management circuit 202 adds 1 entry in the entry chain of the root unit 810(2), wherein the first field of the entry will record information relating to the 1st logical page of the logical unit 710(2) (i.e. "710(2)-1"), and the second field of the entry will record information relating to the $2^{nd}$ physical page of the physical unit 610(5) (i.e. "610(5)-2").

Figure 7E:
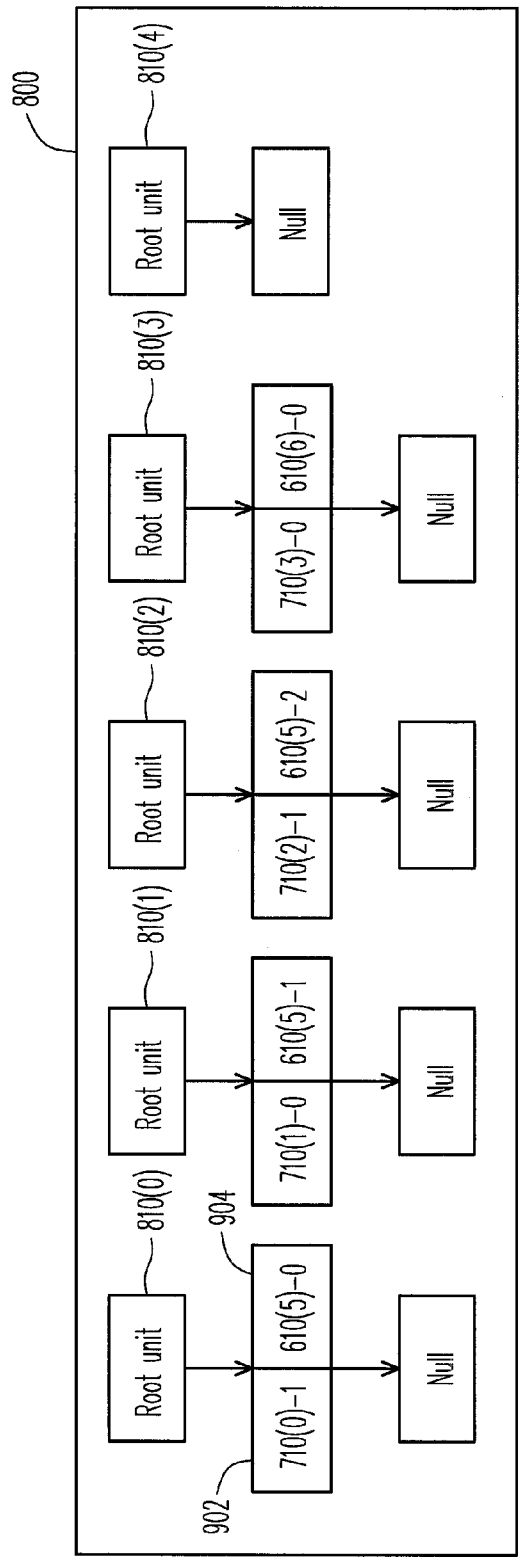
FIG. 7E is a diagram illustrating an example of a global random unit search table according to FIG. 6E.

FIG. 7E is a diagram illustrating an example of a global random unit search table according to FIG. 6E.

Referring to FIG. 7E, when performing the writing operation illustrated in 6E, since the $0^{th}$ logical page of the logical unit 710(3) became an updated logical page, thus, the memory management circuit 202 adds 1 entry in the entry chain of the root unit 810(3), wherein the first field of the entry will record information relating to the $0^{th}$ logical page of the logical unit 710(3) (i.e. "710(3)-0"), and the second field of the entry will record information relating to the $0^{th}$ physical page of the physical unit 610(6) (i.e. "610(6)-0").

Figure 7F:
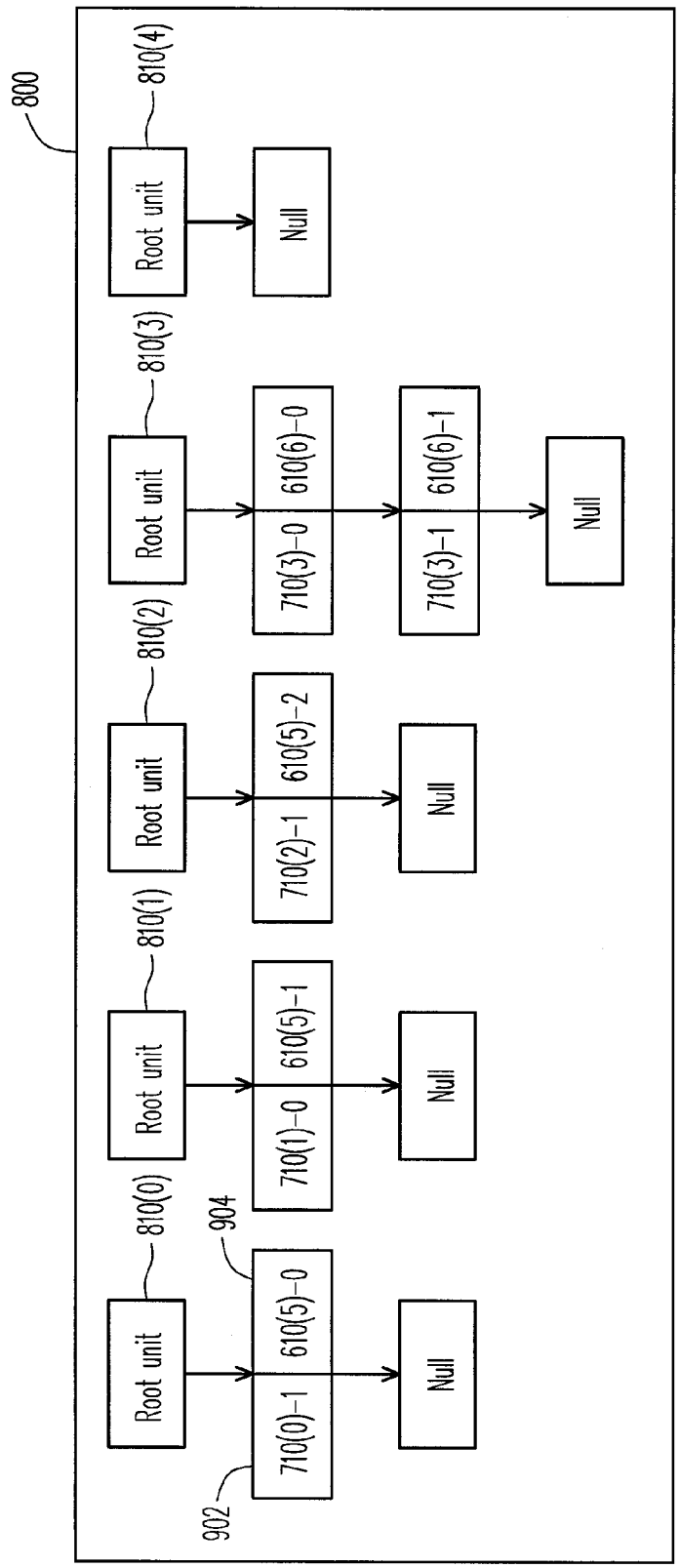
FIG. 7F is a diagram illustrating an example of a global random unit search table according to FIG. 6F.

FIG. 7F is a diagram illustrating an example of a global random unit search table according to FIG. 6F.

Referring to FIG. 7F, when performing the writing operation illustrated in 6F, since the $1^{st}$ logical page of the logical unit 710(3) became an updated logical page, thus, the memory management circuit 202 adds 1 entry in the entry chain of the root unit 810(3), wherein the first field of the entry will record information relating to the $1^{st}$ logical page of the logical unit 710(3) (i.e. "710(3)-1"), and the second field of the entry will record information relating to the $1^{st}$ physical page of the physical unit 610(6) (i.e. "610(6)-1").

Figure 7G:
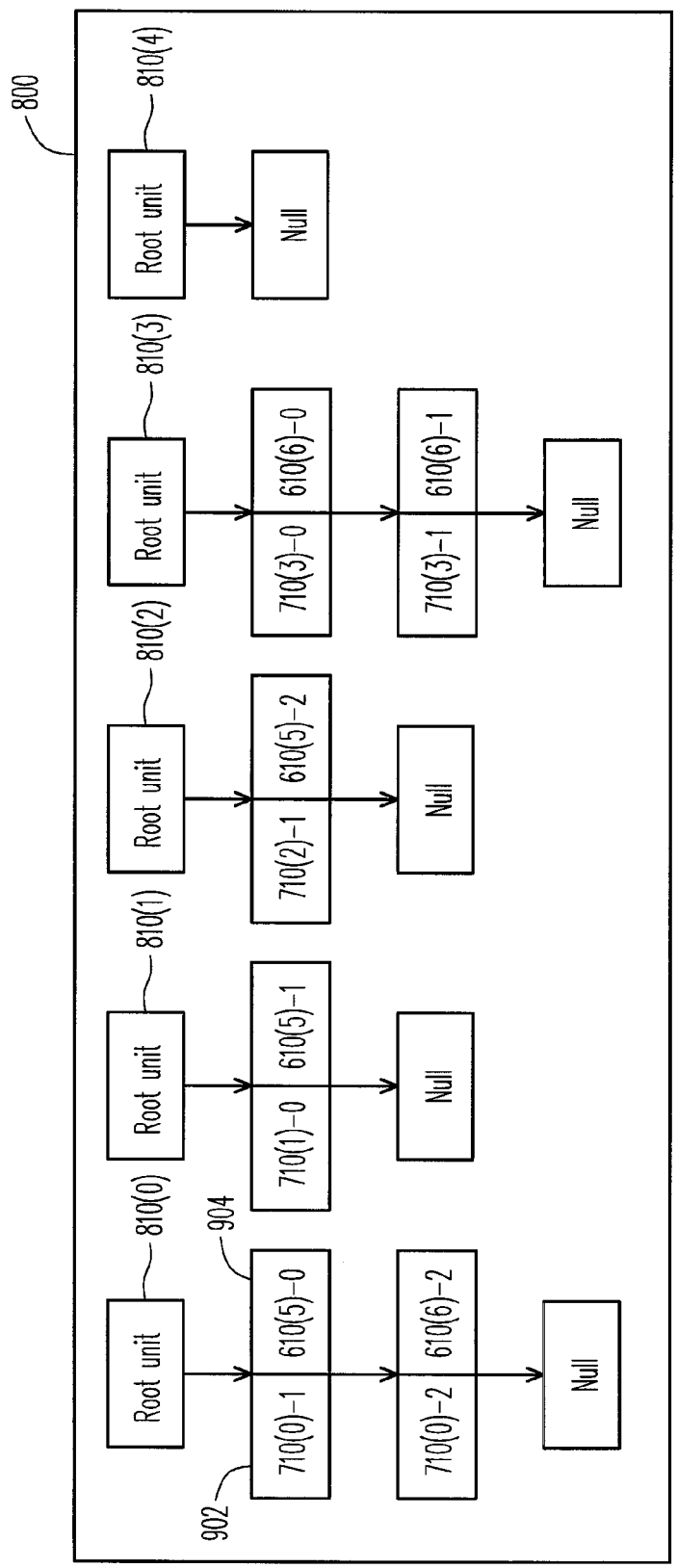
FIG. 7G is a diagram illustrating an example of a global random unit search table according to FIG. 6G.

FIG. 7G is a diagram illustrating an example of a global random unit search table according to FIG. 6G.

Referring to FIG. 7G, when performing the writing operation illustrated in 6G, since the $2^{nd}$ logical page of the logical unit 710(0) became an updated logical page, thus, the memory management circuit 202 adds 1 entry in the entry chain of the root unit 810(0), wherein the first field of the entry will record information relating to the $2^{nd}$ logical page of the logical unit 710(0) (i.e. "710(0)-2"), and the second field of the entry will record information relating to the $2^{nd}$ physical page of the physical unit 610(6) (i.e. "610(6)-2").

Figure 7H:
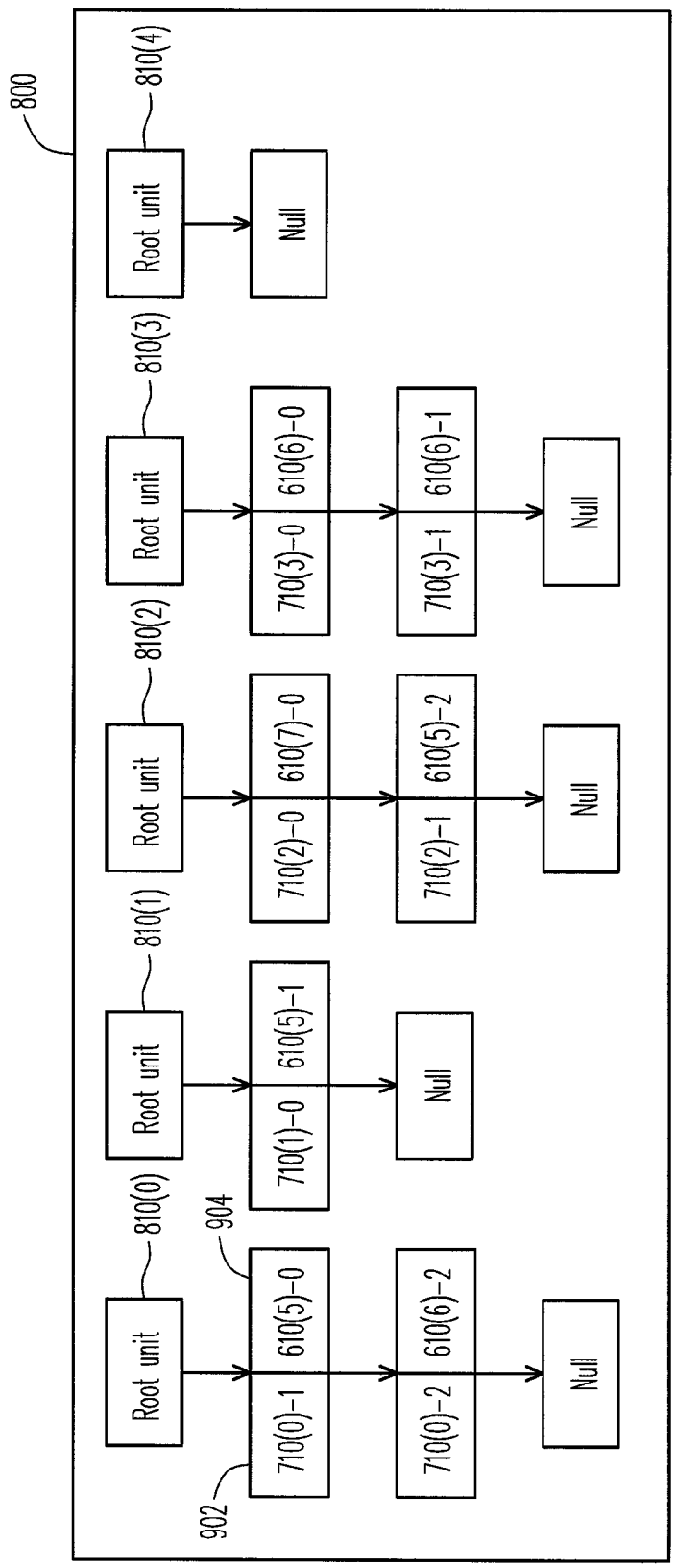
FIG. 7H is a diagram illustrating an example of a global random unit search table according to FIG. 6H.
Figure 71:
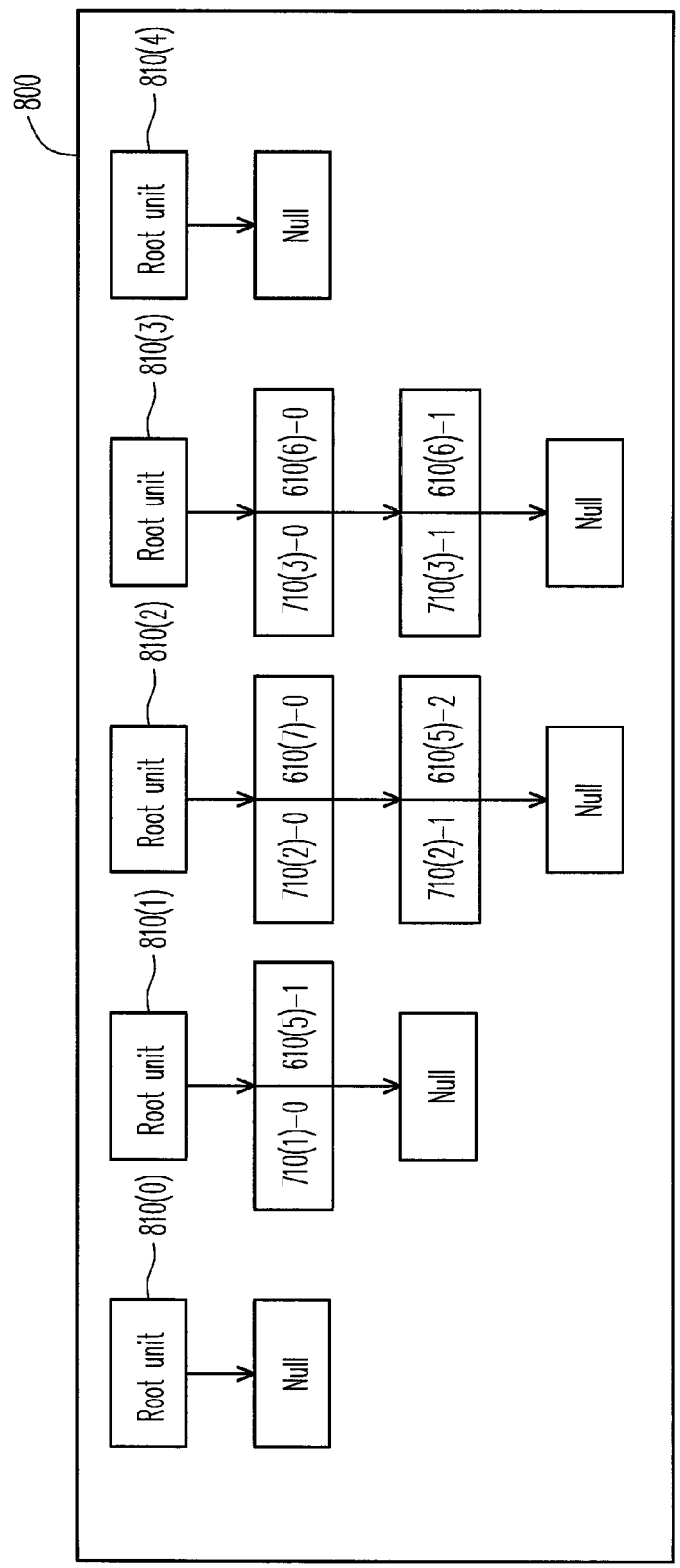

FIG. 7H is a diagram illustrating an example of a global random unit search table according to FIG. 6H.

Referring to FIG. 7H, when performing the writing operation illustrated in 6H, since the $0^{th}$ logical page of the logical unit 710(0) became an updated logical page, thus, the memory management circuit 202 adds 1 entry in the entry chain of the root unit 810(2), wherein the first field of the entry will record information relating to the 0th logical page of the logical unit 710(2) (i.e. "710(2)-0"), and the second field of the entry will record information relating to the $0^{th}$ physical page of the physical unit 610(7) (i.e. "610(7)-0"). In particular, since the entry of the information relating to the $1^{st}$ logical page of the logical unit 710(2) is already in the entry chain corresponding to the root unit 810(2), thus the added entry will be added before the entry. To be specific, the memory management circuit 202 may link the built entries according to the order of the updated logical pages, for search convenience.

It should be noted that when the memory management circuit 202 performs the data merging process, the memory management circuit 202 may delete the corresponding entry.

FIG. 7I is a diagram illustrating an example of a global random unit search table according to FIG. 6I.

Referring to FIG. 7I, when performing the data merging process illustrated in FIG. 6I, since the valid data belonging to the logical unit 710(0) of the global random unit is already copied to the physical unit 610(8), thus, the memory management circuit 202 may delete all the entries of the entry chain of the root unit 810(0).

Figure 8A:
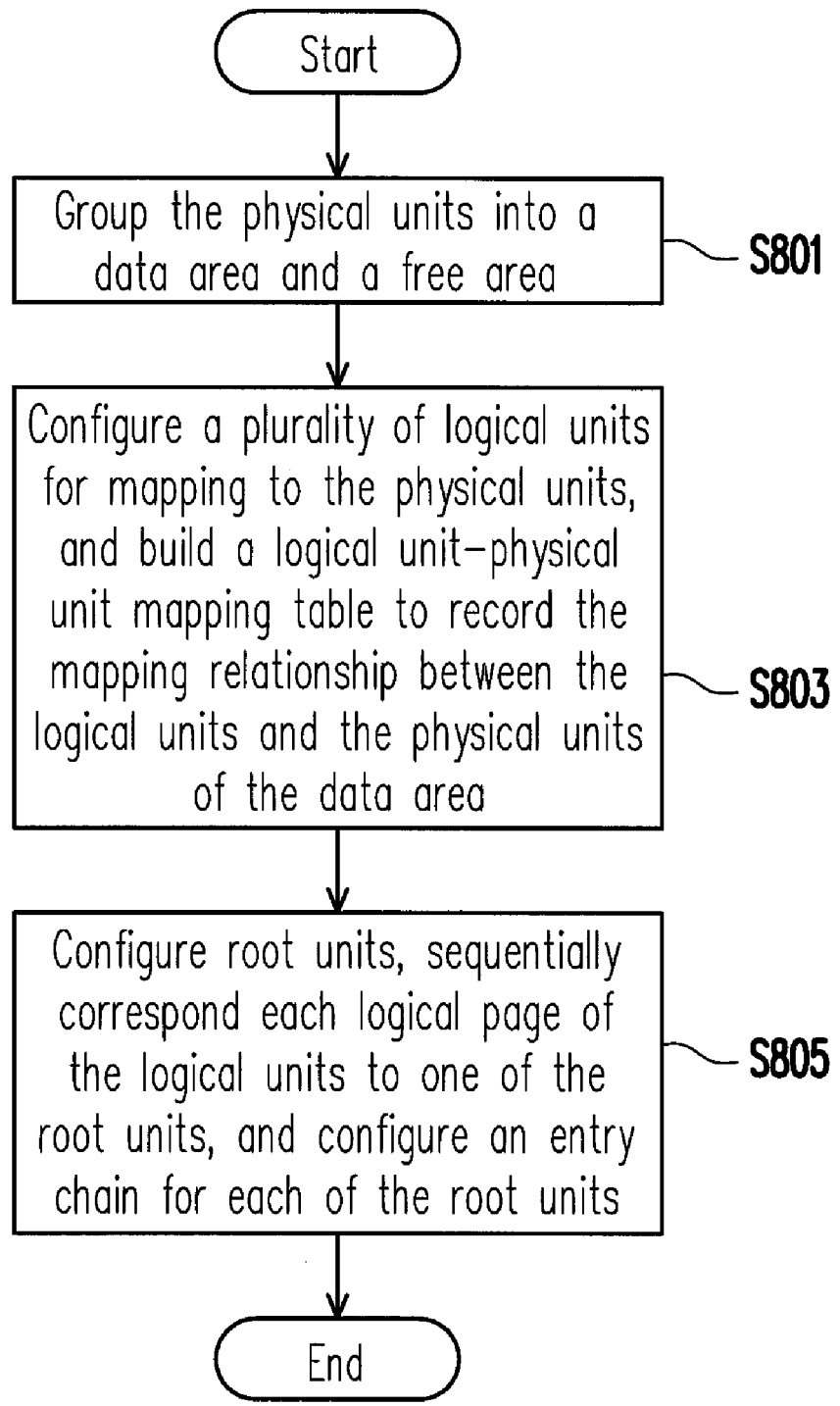
FIGS. 8A, 8B, and 8C are flowcharts of a data management method according to the first exemplary embodiment of the invention.
Figure 8B:
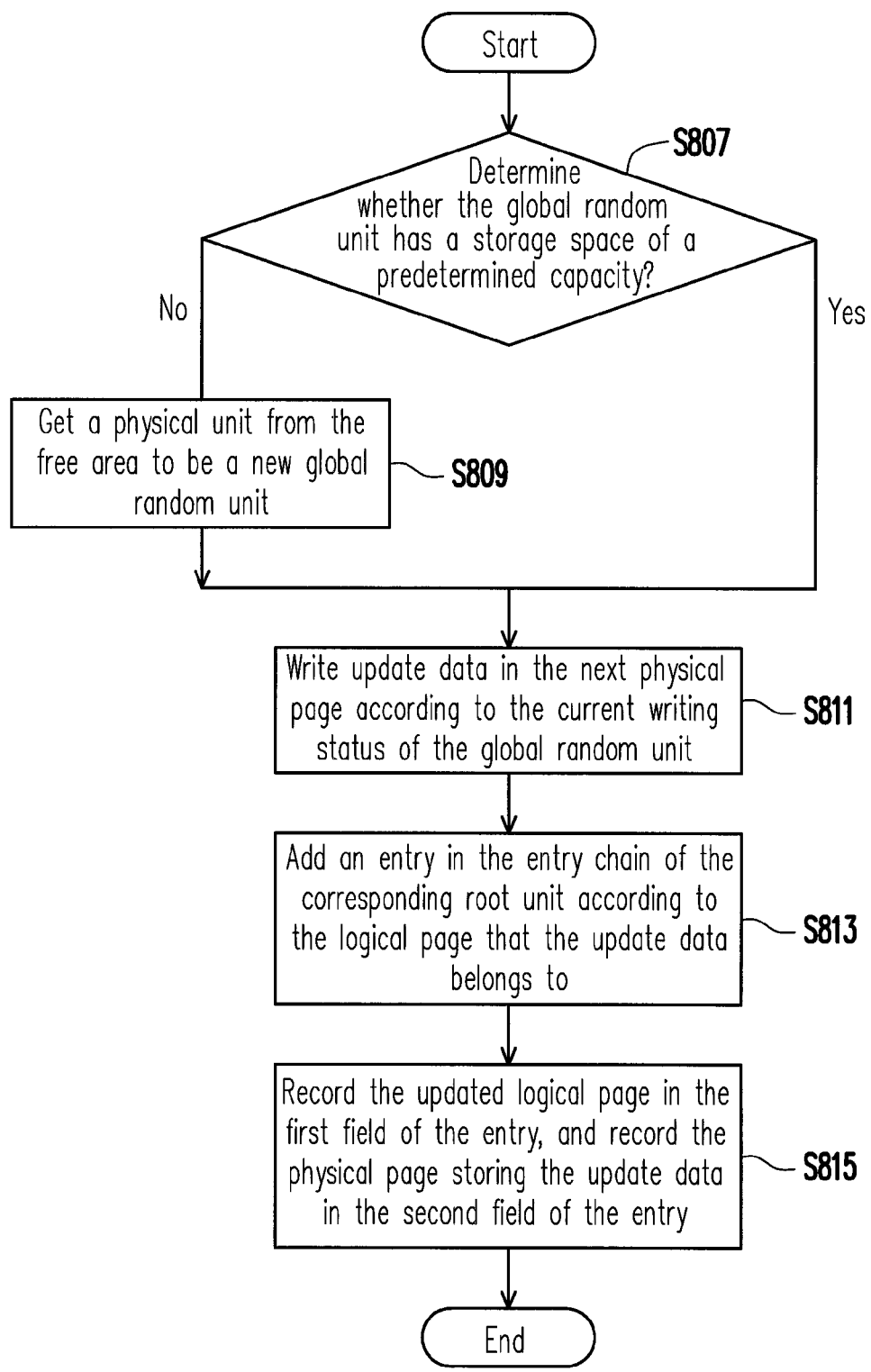
Figure 8C:
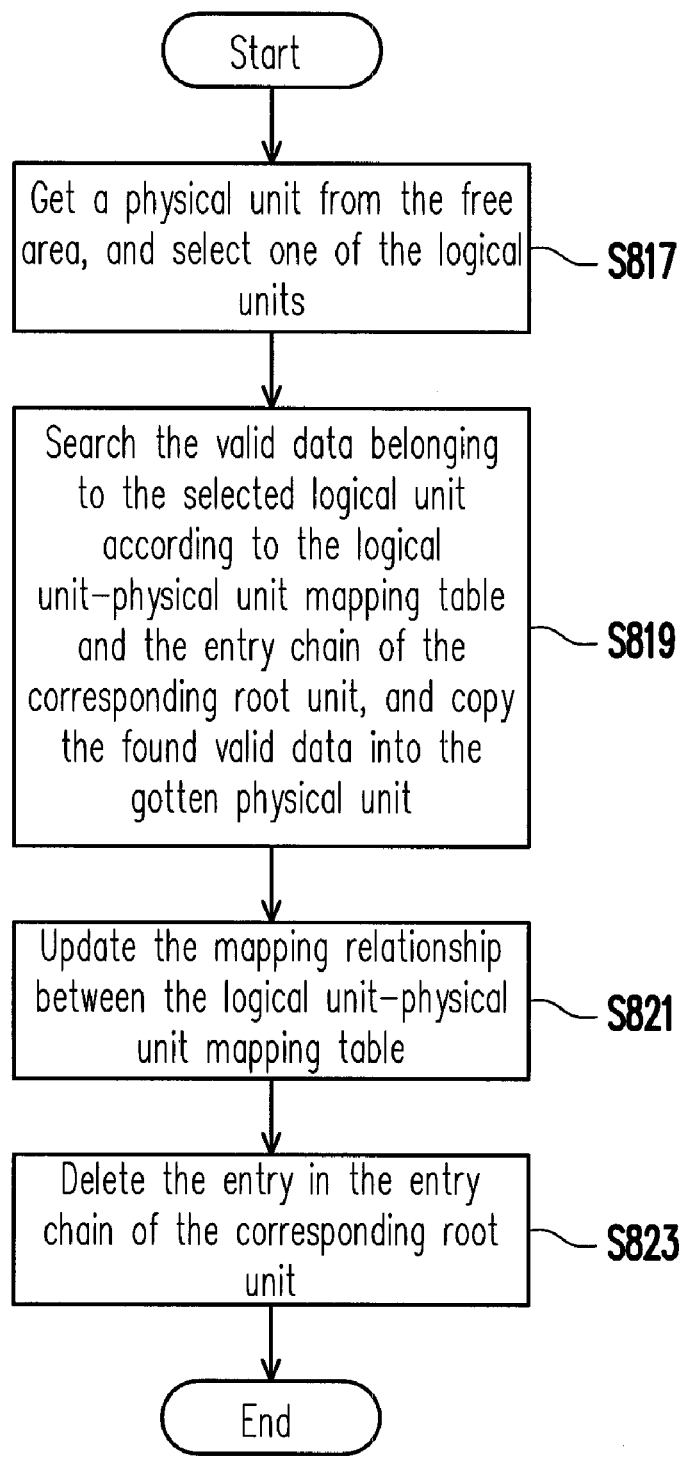

FIGS. 8A, 8B, and 8C are flowcharts of a data management method according to the first exemplary embodiment of the invention. FIG. 8A illustrates the step of initiating the memory storage apparatus, FIG. 8B illustrates the data management step of writing commands, and FIG. 8C illustrates the data management step of performing a data merging process.

Referring to FIG. 8A, in step S801, the memory management circuit 202 groups the physical units of the rewritable non-volatile memory module 106 into a data area 502 and a free area 504. Next, in step S803, the memory management circuit 202 configures a plurality of logical units for mapping to the physical units of the data area 502 and builds a logical unit-physical unit mapping table to record the mapping relationship between the logical units and the physical units of the data area 502.

Next, the step S805, the memory management circuit 202 configures root units, sequentially corresponds each logical page of the logical units to one of the root units, and configures an entry chain for each of the root units. The sequence means arranging according to the increase, decrease, or a predetermined value of the address of the logical pages or other sorting method.

The method of grouping the physical units, configuring the logical units, configuring the root units and entry chains is described above and thus will not be repeated herein.

Referring to FIG. 8B, when performing a programming command to write update data, in step S807, the memory management circuit 202 determines whether the global random unit has a storage space of a predetermined capacity, wherein the predetermined capacity is 0, 2, or another amount of pages. If the global random unit does not have the storage space of the predetermined capacity, then in step S809, the memory management circuit 202 gets a physical unit from the free area 504 to be a new global random unit.

Then, in step S811, the memory management circuit 202 writes update data in the next physical page according to the current writing status of the global random unit. Next, in step S813, the memory management circuit 202 adds an entry in the entry chain of the corresponding root unit according to the logical page that the update data belongs to. And, in step S815, the memory management circuit 202 records the updated logical page in the first field of the entry, and records the physical page storing the update data in the second field of the entry. The method of recording update information in the entry is described accompanied with the figures, and thus will not be repeated herein.

Referring to FIG. 8C, when performing the data merging process, in step S817, the memory management circuit 202 gets a physical unit from the free area 504, and selects one of the logical units. Next, in step S819, the memory management circuit 202 searches the valid data of the selected logical unit according to the logical unit-physical unit mapping table and the entry chain of the corresponding root unit, and copies the found valid data into the gotten physical unit.

Subsequently, in step S821, the memory management circuit 202 updates the mapping relationship between the logical unit-physical unit mapping table, and in 5823, the memory management circuit 202 deletes the entry in the entry chain of the corresponding root unit.

Second Exemplary Embodiment

A memory storage apparatus and a host system in the second exemplary embodiment are essentially similar to the memory storage apparatus and the host system in the first exemplary embodiment, wherein the difference is a memory controller in the second exemplary embodiment further records information related to a logical sector corresponding to an update data in the built entries. In detail, when the data written in the host system only belongs to a part of the logical sectors in the logical pages, under the limitation of programming in units of each physical page in the rewritable non-volatile memory module 106, the memory management circuit 202 must first read the non-updated data of the logical pages from the rewritable non-volatile memory module 106, and regard the update data and the non-updated data as update data to write in a physical page of a global random unit. In the second embodiment, the memory controller may record information relating to the updated logical sector in an entry, and when reading data, the physical sectors storing the updated data are identified in the physical pages of the global random unit. Thus, when writing data in units of each physical page, the non-updated bits are maintained as null values. Therefore, it is not required to first read the non-updated data from the rewritable non-volatile memory module and then be written in the global random unit together with the update data. Here, the figures of the first exemplary embodiment are used to describe difference in the second exemplary embodiment.

Figure 9A:
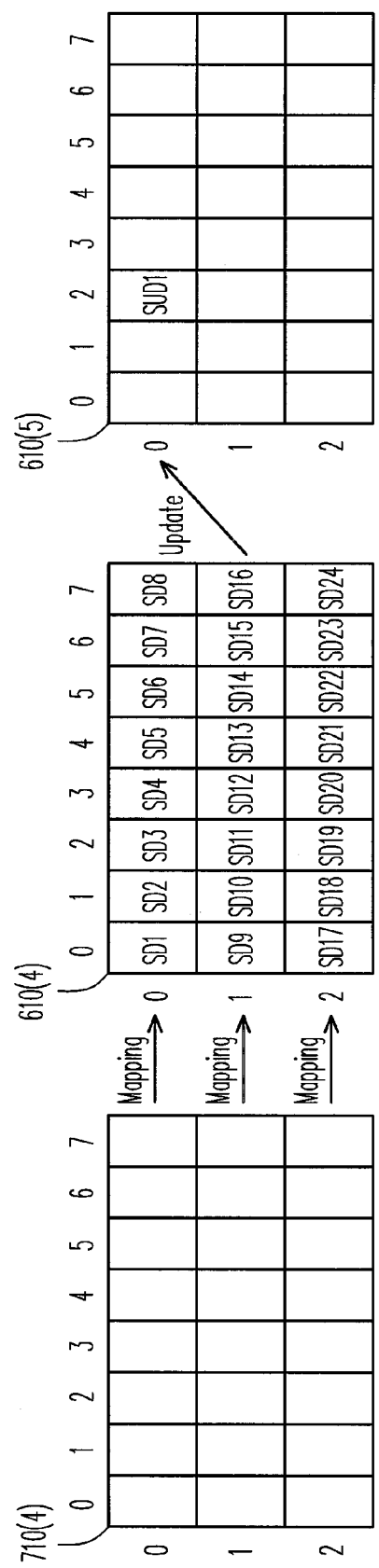
FIG. 9A is a diagram illustrating an example of performing writing according to a second exemplary embodiment of the invention.

FIG. 9A is a diagram illustrating an example of performing writing according to a second exemplary embodiment of the invention.

Referring to FIG. 9A, in order to explain easily, it is assumed that the logical (physical) unit has 3 logical (physical) pages, and each logical (physical) page has 8 logical (physical) sectors. In addition, the logical unit 710(4) currently maps to the physical unit 610(4), and the physical pages of the physical unit 610(4) store the data SD1~SD24 belonging to the logical sectors of the logical pages of the logical unit 710(4).

When the host system 1000 is about to store update data SUD1 belonging to the $2^{nd}$ logical sector of the $1^{st}$ logical page of the logical unit 710(4), the memory management circuit 202 writes the update data SUD1 into the $0^{th}$ physical page of the physical unit 610(5), which is used as the global random unit, in units of the physical page, wherein the part corresponding to the updated sector of the $0^{th}$ physical page of the physical unit 610(5) will be written with the update data SUD1 and the part corresponding to the non-updated logical sectors will be kept with an null value.

In particular, in the exemplary embodiment, after performing the mentioned writing operation, the memory management circuit 202 may record information related to the updated logical sector in the entry corresponding to the $1^{st}$ logical page of the logical unit 710(4). For example, in the second exemplary embodiment, each entry built in the entry chains further comprises a third field and a fourth field, wherein the third field may record an offset corresponding to the updated logical sector, and the fourth field may record a mask corresponding to the updated logical sector. To be specific, the offset indicates a distance between a start address of the updated sector relative to a start address of the logical page, and the mask indicates which sectors are updated starting from a start address of the updated sector.

For example, taking the writing operation in FIG. 9A as an example, the offset corresponding to the $1^{st}$ logical page of the logical unit 710(4) is "2", which means the $2^{nd}$ logical sector of the $1^{st}$ logical page of the logical unit 710(4) is the start address of the updated logical sector. In addition, for example, the mask corresponding to the $1^{st}$ logical page of the logical unit 710(4) is "00000001", wherein each unit from right to left of the mask respectively represents the corresponding logical sector starting from the start address of the updated logical sector, "1" means the corresponding logical sector is updated and "0" means the corresponding logical sector is not updated. Thus, by using the offset and mask corresponding to the $1^{st}$ logical page of the logical unit 710 (4), it can be known that only the $2^{nd}$ logical sector of the $1^{st}$ logical page of the logical unit 710(4) is updated. It should be noted that the recording method of the offset and the mask is not limited thereto. For example, in another embodiment of the invention, each unit from left to right of the mask can also respectively represent the corresponding logical sector starting from the start address of the updated logical sector. In addition, "0" can represent the logical sector is not updated, and the "1" can represent the logical sector is updated.

Figure 9B:
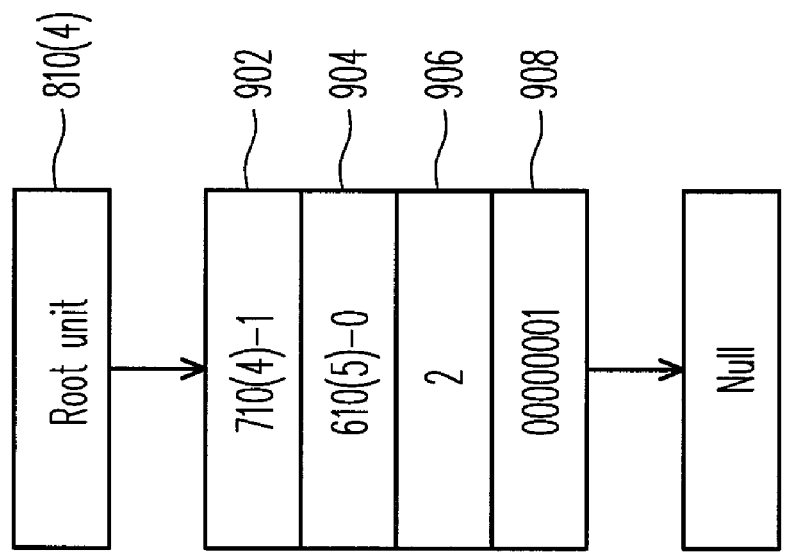
FIG. 9B is a diagram illustrating an example of a global random unit search table according to FIG. 9A.

FIG. 9B is a diagram illustrating an example of a global random unit search table according to FIG. 9A. For the sake of simplicity, it is assumed that the logical page of the logical unit 710(4) corresponds to the root unit 810(4), and only the entry chain of the root unit 810(4) is illustrated.

Referring to FIG. 9B, when performing the writing operation illustrated in 9A, since the $1^{st}$ logical page of the logical unit 710(4) became an updated logical page, thus, the memory management circuit 202 adds 1 entry in the entry chain of the root unit 810(0), wherein the first field 902 of the entry will record information relating to the $1^{st}$ logical page of the logical unit 710(4) (i.e. "710(4)-1"), and the second field 904 of the entry will record information relating to the $0^{th}$ logical page of the logical unit 610(5) (i.e. "610(5)-0"). The third field 906 will record the corresponding offset (i.e. "2"), and the fourth field 908 will record the mask (i.e. "00000001").

Figure 10:
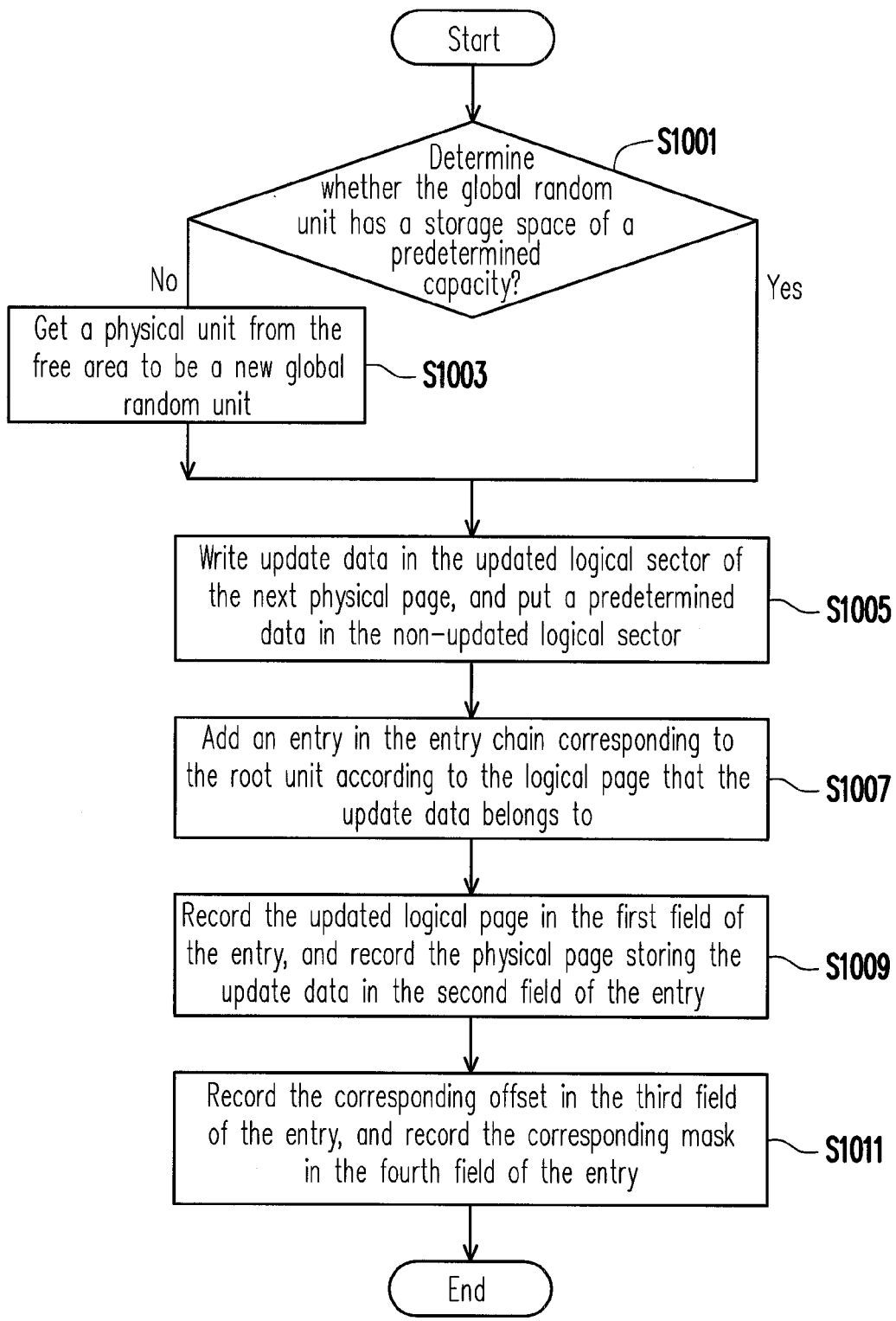
FIG. 10 is a flowchart of a data management method according to the second exemplary embodiment of the invention.

FIG. 10 is a flowchart of a data management method according to the second exemplary embodiment of the invention, wherein only the data management steps of performing write commands is illustrated.

Referring to FIG. 10, when performing a programming command to write update data, in step S1001, the memory management circuit 202 determines whether the global random unit has a storage space of a predetermined capacity.

If the global random unit does not have the storage space of the predetermined capacity, then in step S1003, the memory management circuit 202 gets a physical unit from the free area 504 to be a new global random unit.

Then, in step S1005, the memory management circuit 202 writes the update data in the updated logical sectors of the next physical page, and put a predetermined data in the non-updated logical sectors, such as a null value. Specifically, in step S1005, the memory management circuit 202 writes the update data in units of the physical page by writing the update data in the physical sectors corresponding to the updated logical sectors and putting the null value in the physical sectors corresponding to the non-updated logical sectors, to write update data with the physical page as a unit. Then, in step S1007, the memory management circuit 202 adds an entry in the entry chain corresponding to the root unit according to the logical page that the update data belongs to.

Next, in step S1009, the memory management circuit 202 records the updated logical page in the first field of the entry, and record the physical page storing the update data in the second field of the entry.

Finally, in step S1011, the memory management circuit 202 records the corresponding offset in the third field of the entry, and record the corresponding mask in the fourth field of the entry. The method of recording update information in the entries are described accompanied with the figures, and thus will not be repeated herein.

In summary, the data management method of the embodiment of the invention can quickly search for valid data corresponding to a logical unit from the global random unit, thus, the time for performing the data merging process can be substantially reduced. In addition, by using the entry chain to record update information can effectively reduce the storage space required to stored update information. Furthermore, through recording the offset and the mask of the updated logical pages, update data is written in the data of non-updated logical sector data that is not required to be read, thus increasing the speed of performing write commands. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data management method for managing data written in a rewritable non-volatile memory module, wherein the rewritable non-volatile memory module includes a plurality of physical units, and each of the physical units includes a plurality of physical pages, the data management method comprises:

grouping the physical units into at least a data area and a free area, wherein the physical units of the free area are used to substitute the physical units of the data area to write data;

configuring a plurality of logical units for mapping to the physical units of the data area;

building a logical unit-physical unit mapping table to record a mapping relationship between the logical units and the physical units of the data area, wherein each of the logical units includes a plurality of logical pages;

configuring a plurality of root units for the logical pages of the logical units, wherein each of the logical pages corresponds to one of the root units;

respectively configuring entry chains for the root units, wherein each of entry chains independently corresponds to one of the root units;

getting at least one physical unit from the free area to be at least one global random unit;

writing a plurality of update data belonging to a plurality of updated logical pages among the logical pages into the physical pages of the at least one global random unit; and maintaining the entry chains to record a plurality of update information corresponding to the updated logical pages, wherein the update information corresponding to the updated logical pages belonging to the same root unit is recorded on one of the entry chains.

2. The data management method as claimed in claim 1, wherein the step of maintaining the entry chains to record the update information corresponding to the updated logical pages comprises:

building a plurality of entries on each of the entry chains, wherein each of the entry chains corresponds to one of the update data; and recording information related to the physical pages storing the update data among the physical units in the entries.

3. The data management method as claimed in claim 2, wherein each of the entries includes a first field and a second field, wherein the first fields are respectively used to record addresses of the updated logical pages, wherein the second fields are respectively used to record addresses of the physical pages storing the update data belonging to the updated logical pages.

4. The data management method as claimed in claim 2, wherein a plurality of first update data among the update data respectively belong to a plurality of first updated logical pages among the updated logical pages, the first updated logical pages belong to a first root unit among the root units, and the update information of the first update data is recorded in a first entry chain corresponding to the first root unit among the entry chains, wherein the entries of the first entry chain are linked sequentially according to an order of the first updated logical pages.

5. The data management method as claimed in claim 3, wherein each of the logical pages includes a plurality of logical sectors, and each of the update data belongs to at least one updated logical sector among the logical sectors of one of the updated logical pages, wherein the step of maintaining the entry chains to record the update information corresponding to the updated logical pages comprises:

recording information related to at least one updated logical sector of each of the updated logical pages in the entry chains.

6. The data management method as claimed in claim 5, wherein each of the entries further comprises a third field and a fourth field,
  wherein each of the third fields is used to record an offset between an address of the at least one updated logical sector of a certain updated logical page and a start address of the certain updated logical pages,
  wherein each of the fourth fields is used to record a mask corresponding to the address of the at least one updated logical sector of the certain updated logical page.

7. A memory controller for managing a rewritable non-volatile memory module, wherein the rewritable non-volatile memory module includes a plurality of physical units, and each of the physical units comprises a plurality of physical pages, the memory controller comprising:
  a host interface, configured to couple to a host system;
  a memory interface, configured to couple to the rewritable non-volatile memory module; and
  a memory management circuit, coupled to the host interface and the memory interface, wherein the memory management circuit is configured to group the physical units into at least a data area and a free area, wherein the physical units of the free area are used to substitute the physical units of the data area to write data,
  wherein the memory management circuit is further configured to configure a plurality of logical units for mapping to the physical units of the data area and build a logical unit-physical unit mapping table to record a mapping relationship between the logical units and the physical units of the data area, wherein each of the logical units includes a plurality of logical pages,
  wherein the memory management circuit is further configured to configure a plurality of root units for the logical pages of the logical units, wherein each of the logical pages sequentially corresponds to one of the root units,
  wherein the memory management circuit is further configured to respectively configure entry chains for the root units, wherein each of entry chains independently corresponds to one of the root units,
  wherein the memory management circuit is further configured to get at least one physical unit from the free area to be at least one global random unit, and write a plurality of update data belonging to a plurality of updated logical pages among the logical pages into the physical pages of the at least one global random unit,
  wherein the memory management circuit is further configured to maintain the entry chains to record a plurality of update information corresponding to the updated logical pages, wherein the update information corresponding to the updated logical pages belonging to the same root unit is recorded on one of the entry chains.

8. The memory controller as claimed in claim 7, wherein the memory management circuit is further configured to build a plurality of entries on each of the entry chains, wherein each of the entry chains corresponds to one of the update data,
  wherein the memory management circuit is further configured to record information related to the physical pages storing the update data among the physical units in the entries.

9. The memory controller as claimed in claim 8,
  wherein each of the entries includes a first field and a second field,
  wherein the first fields are respectively used to record addresses of the updated logical pages,
  wherein the second fields are respectively used to record addresses of the physical pages storing the update data belonging to the updated logical pages.

10. The memory controller as claimed in claim 8, wherein a plurality of first update data among the update data respectively belong to a plurality of first updated logical pages among the updated logical pages, the first updated logical pages belong to a first root unit among the root units, and the update information of the first update data is recorded in a first entry chain corresponding to the first root unit among the entry chains,
  wherein the memory management circuit is further configured to sequentially link the entries of the first entry chain according to addresses of the first updated logical pages.

11. The memory controller as claimed in claim 9, wherein each of the logical pages includes a plurality of logical sector addresses, and each of the update data belongs to at least one updated logical sector of the logical sectors of one of the updated logical pages,
  wherein the memory management circuit is further configured to record information related to at least one updated logical sector of each of the updated logical pages in the entry chains.

12. The memory controller as claimed in claim 11, wherein each of the entries further comprises a third field and a fourth field,
  wherein each of the third field is used to record an offset between an address of the at least one updated logical sector of a certain updated logical page and a start address of the certain updated logical pages,
  wherein each of the fourth fields is used to record a mask corresponding to the address of the at least one updated logical sector of the certain updated logical page.

13. A memory storage apparatus, comprising:
  a connector, configured to couple to a host system;
  a rewritable non-volatile memory module, comprising a plurality of physical blocks; and
  a memory controller, coupled to the connector and the rewritable non-volatile memory module, wherein the memory controller is configured to group the physical units into at least a data area and a free area, wherein the physical units of the free area are used to substitute the physical units of the data area to write data,
  wherein the memory controller is further configured to configure a plurality of logical units for mapping to the physical units of the data area and build a logical unit-physical unit mapping table to record a mapping relationship between the logical units and the physical units of the data area, wherein each of the logical units includes a plurality of logical pages for mapping the physical pages of each of the physical units of the data area,
  wherein the memory controller is further configured to configure a plurality of root units for the logical pages of the logical units, wherein each of the logical pages corresponds to one of the root units,
  wherein the memory controller is further configured to respectively configure entry chains for the root units, wherein each of entry chains independently corresponds to one of the root units,
  wherein the memory controller is further configured to get at least one physical unit from the free area to be at least one global random unit, and write a plurality of update data belonging to a plurality of updated logical pages among the logical pages into the physical pages of the at least one global random unit,
  wherein the memory controller is further configured to maintain the entry chains to record a plurality of update information corresponding to the updated logical pages, wherein the update information corresponding to the updated logical pages belonging to the same root unit is recorded on one of the entry chains.

14. The memory storage apparatus as claimed in claim 13, wherein the memory controller is further configured to build a plurality of entries on each of the entry chains, wherein each of the entry chains corresponds to one of the update data, wherein the memory controller is further configured to record information related to the physical pages storing the update data among the physical units in the entries.

15. The memory storage apparatus as claimed in claim 14, wherein each of the entries includes a first field and a second field, wherein the first fields are respectively used to record addresses of the updated logical pages, wherein the second fields are respectively used to record addresses of the physical pages storing the update data belonging to the updated logical pages.

16. The memory storage apparatus as claimed in claim 14, wherein a plurality of first update data among the update data respectively belong to a plurality of first updated logical pages among the updated logical pages, the first updated logical pages belong to a first root unit among the root units, and the update information of the first update data is recorded in a first entry chain corresponding to the first root unit among the entry chains, wherein the memory controller is further configured to sequentially link the entries of the first entry chain according to an order of the first updated logical pages.

17. The memory storage apparatus as claimed in claim 15, wherein each of the logical pages includes a plurality of logical sector addresses, and each of the update data belongs to at least one updated logical sector of the logical sectors of one of the updated logical pages, wherein the memory controller is further configured to record information related to at least one updated logical sector of each of the updated logical pages in the entry chains.

18. The memory storage apparatus as claimed in claim 17, wherein each of the entries further comprises a third field and a fourth field, wherein each of the third field is used to record an offset between an address of the at least one updated logical sector of a certain updated logical page and a start address of the certain updated logical pages, wherein each of the fourth fields is used to record a mask corresponding to the address of the at least one updated logical sector of the certain updated logical page.

* * * * *